United States Patent
Koizumi et al.

[11] Patent Number: 5,203,159
[45] Date of Patent: Apr. 20, 1993

[54] PRESSURIZED FLUIDIZED BED COMBUSTION COMBINED CYCLE POWER PLANT AND METHOD OF OPERATING THE SAME

[75] Inventors: Naoto Koizumi, Hitachi; Asao Takashi, Juoo; Shinichi Hoizumi, Hitachi; Yoshiki Noguchi, Hitachi; Toshihiko Sasaki, Hitachi, all of Japan

[73] Assignees: Hitachi Ltd., Chiyoda; Hitachi Engineering Co., Ltd., Hitachi, both of Japan

[21] Appl. No.: 668,203

[22] Filed: Mar. 12, 1991

[30] Foreign Application Priority Data

Mar. 12, 1990 [JP] Japan .................. 2-57950
Aug. 29, 1990 [JP] Japan .................. 2-225078

[51] Int. Cl.⁵ .................. F02C 3/26; F02C 6/18
[52] U.S. Cl. .................. 60/39.02; 60/39.182; 60/39.464
[58] Field of Search .................. 60/39.02, 39.06, 39.12, 60/39.182, 39.464, 39.23

[56] References Cited

U.S. PATENT DOCUMENTS

| | | | |
|---|---|---|---|
| 4,306,411 | 12/1981 | Zoll .................. | 60/39.464 |
| 4,462,206 | 7/1984 | Aguet .................. | 60/39.182 |
| 4,590,868 | 5/1986 | Ishihara .................. | 60/39.464 |
| 4,838,209 | 6/1989 | Hjalmarsson .................. | 122/4 D |
| 4,852,354 | 8/1989 | Greis .................. | 60/39.464 |

FOREIGN PATENT DOCUMENTS

| | | |
|---|---|---|
| 3123391 | 12/1982 | Fed. Rep. of Germany . |
| 3801886 | 10/1988 | Fed. Rep. of Germany . |
| 7627137 | 4/1977 | France . |
| 164732 | 12/1980 | Japan . |
| 212309 | 12/1982 | Japan . |
| 75406 | 4/1988 | Japan . |
| 2133839 | 8/1984 | United Kingdom . |

OTHER PUBLICATIONS

Pillai K. "Pressurized Fluidized Bed Combustion" Lund University Press, Sweden.

*Primary Examiner*—Louis J. Casaregola
*Attorney, Agent, or Firm*—Antonelli, Terry, Stout & Kraus

[57] ABSTRACT

A pressurized fluidized bed combustion combined cycle power plant has a gas turbine unit of single spindle type in which a turbine, driven by combustion gas from burning of coal in a pressurized fluidized bed combustion boiler, drives an electrical generator at constant speed and drives a compressor supplying compressed combustion air to the boiler. To permit partial load operation, a control arrangement is provided to effect, in dependence upon an operating load of the boiler, control of at least one of the flow rate of the combustion air into the boiler, and the operating pressure in the combustion chamber of the boiler. The control arrangement may be, for example, a valve controlling a by-pass flow of the combustion air and/or inlet guide vanes of the compressor.

19 Claims, 21 Drawing Sheets

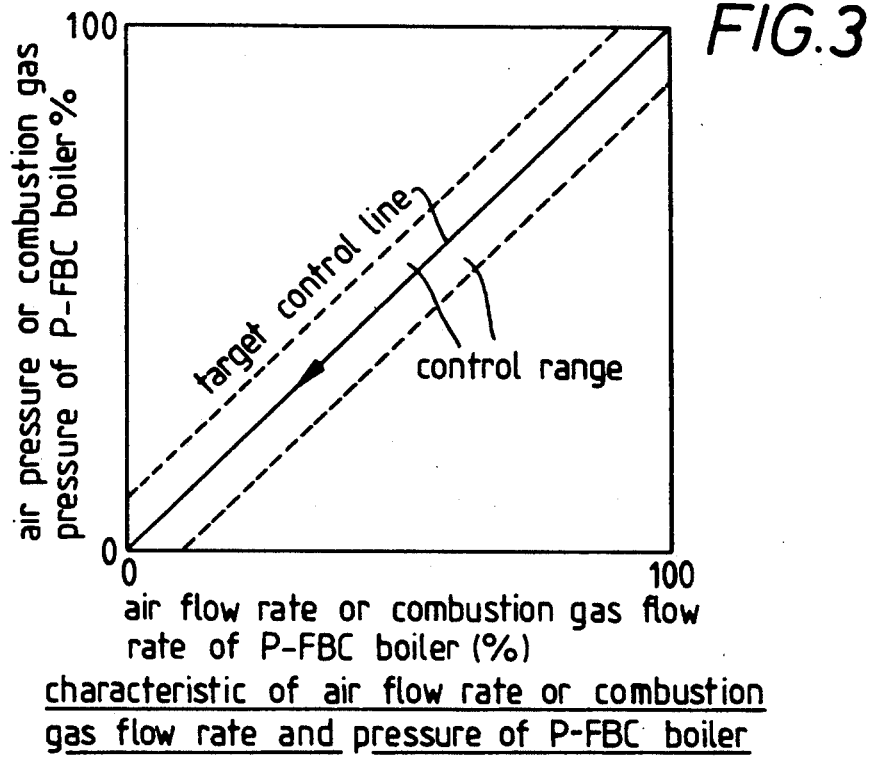
characteristic of air flow rate or combustion gas flow rate and pressure of P-FBC boiler
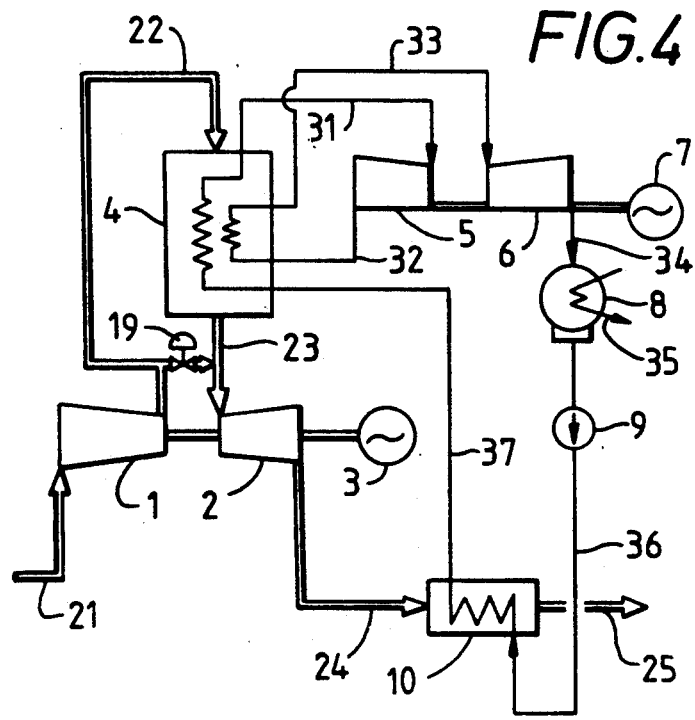

characteristic of bypass air flow rate control characteristic of gas turbine inlet guide vane opening control

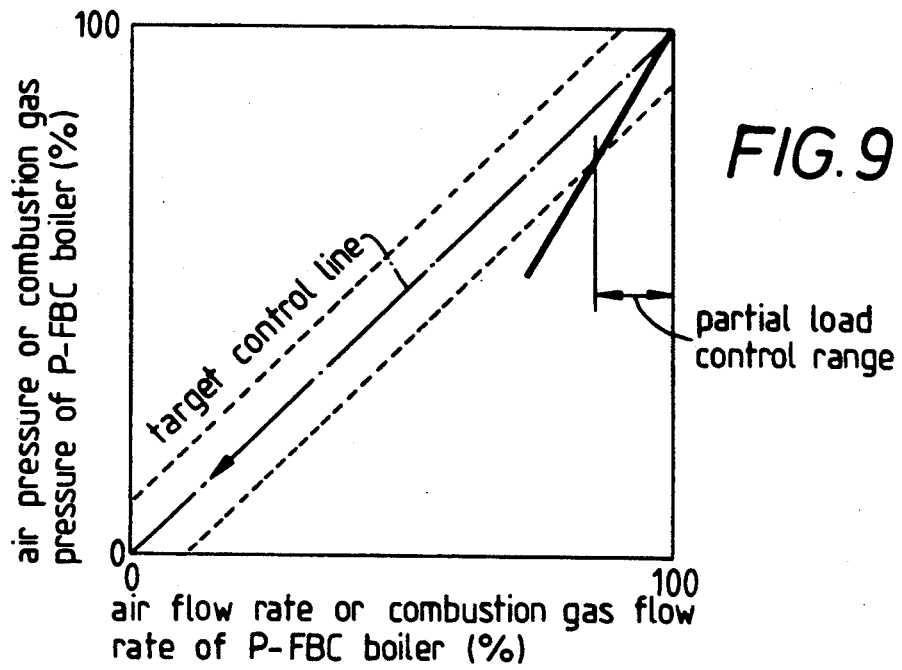

characteristic of expansion turbine control characteristic of pressure control by booster compressor partial load characteristic (combined control of bypass valve and expansion turbine)

partial load characteristic (combined control of bypass valve and throttle valve (throttle damper))

partial load characteristic (combined control of bypass valve and booster compressor)

partial load characteristic (combined control of gas turbine inlet guide vane and throttle valve (throttle damper))

partial load characteristic (combined control of gas turbine inlet guide vane and expansion turbine)

partial load characteristic (combined control of throttle valve and expansion turbine)

partial load characteristic (combined control of expansion turbine and booster compressor)

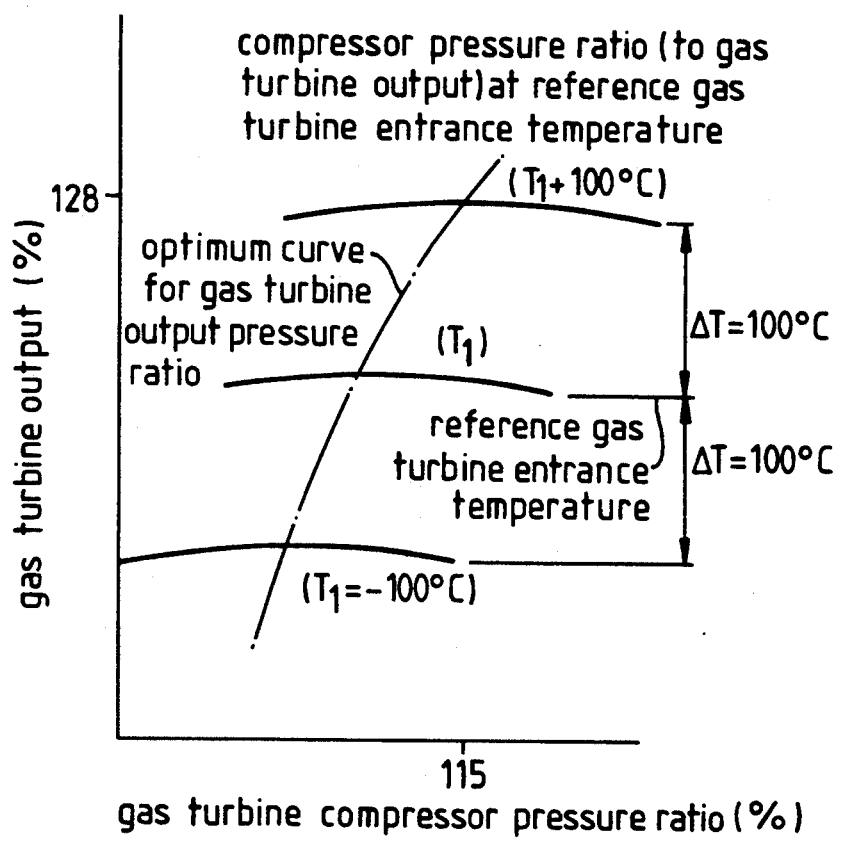

PRESSURIZED FLUIDIZED BED COMBUSTION COMBINED CYCLE POWER PLANT AND METHOD OF OPERATING THE SAME

BACKGROUND OF THE INVENTION

1. Field of the Invention

The present invention relates to a pressurized fluidized bed combustion combined cycle power plant and method of operating the same; more particularly to a combined cycle power plant comprising a pressurized fluidized bed combustion boiler combustion boiler for burning coal and producing steam,, a gas turbine, a compressor and a generator, with the steam being usable to drive a steam turbine and with means being provided for maintaining a stable fluidization in the pressurized fluidized bed combustion boiler even at partial load.

2. Description of the Prior Art

A known combined plant includes a gas turbine, a steam turbine and a waste heat recovery boiler arrangement so that the steam turbine may be driven with the steam produced in the waste heat recovery boiler by the exhaust gases from the gas turbine. A combined plant of the aforementioned type using a pressurized fluidized bed combustion boiler as a combustor for the gas turbine is generally called a "pressurized fluidized bed combustion combined cycle power plant".

Most known pressurized fluidized bed combustion combined cycle power plants are constructed by employing a double-spindle type gas turbine unit as schematically illustrated in FIG. 2. At full-load operation of this plant, the combustion air boosted by the gas turbine compressor, is completely introduced into the pressurized fluidized bed combustion boiler, in which a fuel or coal is poured and burned to operate the gas turbine. On the other hand, the steam is produced by recovering the heat in the pressurized fluidized bed combustion boiler and the waste heat recovery boiler of the gas turbine and is led into the steam turbine to operate the steam turbine. However, at partial load operation the combustion air flow rate and the pressure in the pressurized fluidized bed combustion boiler are varied for the partial load operation of the plant by changing the speed of the gas turbine compressor.

If, however, a single-spindle gas turbine unit employed is the speeds of both the compressor and the turbine are always the same, because the generator, driven by the same spindle, must rotate at constant speed. As a result, full-load operation is performed as with the double-spindle gas turbine. For a partial load operation, however, the discharge air flow rate of the gas turbine compressor is not changed from that in the full-load operation, nor is the pressure in the pressurized fluidized bed combustion boiler changed, so that, in principle, partial load operation of the pressurized fluidized bed combustion combined cycle power plant is impossible. The present invention overcomes this problem, as described below.

In, for example, JP-A-55-164732, a power plant having a double-spindle gas turbine is disclosed wherein, in order to limit the temperature of the combustion gas reaching the turbine, a bypass line, controlled by a valve, is disposed between the compressor outlet line and the turbine inlet line.

Other prior art documents showing a control element or division in the compressor outlet line include JP-A-63-75406 wherein the line is divided, to provide two controlled air flows to the pressurized fluidized bed combustor, in order to improve combustion efficiency by increasing the temperature at the top of the combustor. Similarly in JP-A-57-212309, the compressed air line divides, in order to supply air to a second burner arranged in the combustion gas line to the gas turbine. In U.S. Pat. No. 4,838,209, valves are provided in the compressed air line, the gas turbine inlet line and a bypass line connecting these two lines, with the two lines being used for emergency shut-down. In U.S. Pat. No. 4,852,345 branch line from the main compressed air line includes a valve and supplies air to a distributor for cooling fluidized bed material in an ash chamber. After cooling the bed material, this air is used in the combustion.

A general review of the development of pressurized fluidized bed combustion and its application in combined cycle power plants is given by Pillai in pages 555–593 of "Electricity: efficient end-use and new generation technologies and their planning implications", published by Lund University Press, Sweden and Chartwell-Bratt, England.

SUMMARY OF THE INVENTION

A disadvantage of the aforementioned prior art resides in the fact that the design of the pressurized fluidized bed combustion combined cycle power plant is restricted, to the type of gas turbine used. In order to reduce this restriction, therefore, it is very effective, for the pressurized fluidized bed combustion combined cycle power plant using the single-spindle gas turbine unit, if the partial load operation is possible as in a pressurized fluidized bed combustion combined cycle power plant using a double-spindle gas turbine unit.

An object of the present invention is to enable the pressurized fluidized bed combustion combined cycle power plant to perform at partial load operation even when a single-spindle gas turbine unit is used.

In accordance with advantageous features of the present invention, a pressurized fluidized bed combustion cycle power plant is provided which includes a pressurized fluidized bed combustion boiler for burning coal and producing steam by the combustion heat, with the boiler having a combustion chamber in which the coal is burned. A gas turbine unit includes a single spindle having a turbine driven by combustion gas from the burning of the coal in the boiler. The spindle is rotated at a constant speed by the turbine, and an electrical generator is driven at a constant speed by the spindle. A compressor is arranged on the spindle and supplies compressed air to the boiler, with the compressed air being combustion air for enabling a burning of the coal. Control means are provided which are adapted and arranged to effect, in dependence upon an operating load of the boiler, control of at least one of a flow rate of the combustion air into the boiler and/or the operating pressure in the combustion chamber of the boiler.

A gas turbine unit of single spindle type has a compressor and a turbine on a common spindle, the turbine having, at least at full load operation of the power plant, an inlet pressure which is essentially equal to the operating pressure of the boiler and an outlet pressure which is essentially equal to the combustion gas exhaust pressure of the power plant. Small pressure loss may be caused by, for example, dust separators upstream of the turbine, but, in principle, the full pressure drop is across the turbine. This is in contrast with the double-spindle type where two turbines, on different spindles, are in series.

By the invention control of the combustion air flow rate and/or the operating pressure so as to maintain support of the combustion of the coal over a load range of the boiler from full load to less than 80% of full load, even more advantageously from full load to less than 60% of full load.

Preferably the control is achieved by adjustment of at least two adjusting means, each adapted to adjust at least one of the combustion air flow rate and the operating pressure. In the attached drawings, various combinations of such adjusting means are illustrated. Such adjusting means may include two or more of (i) a throttle valve controlling air pressure at the compressor inlet, (ii) vanes controlling air flow rate at the compressor inlet, (iii) a bypass valve controlling air flow rate from the compressor to the boiler, (iv) drive means of a booster compressor controlling pressure of air supplied from the compressor to the boiler, (v) a valve controlling flow through an expansion turbine operated by compressed air from the compressor, (vi) a valve controlling combustion gas flow rate from the boiler to the single spindle turbine, and (vii) a valve controlling combustion gas flow from the boiler to a second gas turbine which is not mounted on the spindle of the gas turbine unit.

In one preferred form of the invention, a power plant has adjustable vanes for controlling air flow rate into the compressor, a conduit extending from the compressor to the boiler for the pressurized combustion air, a conduit extending from the boiler to the turbine for the combustion gas, a by-pass connecting the first conduit to the second conduit, and flow control means for controlling the air flow rate in the by-pass, with the control being effected by control of at least one of the vanes and the flow control means of the bypass.

Preferably, in accordance with the method of the present invention the vanes are adjusted in order to control the plant operation over a first range of operating load of the plant, and the flow control means of the bypass are adjusted in order to control the plant operation over a second range of operating load of the plant, with the first range being closer to the full operating load of the plant than the second range.

It is also preferable to control at least one of the combustion air flow rate and the operating pressure in order to control the temperature of the inlet gas to the gas turbine in dependence upon the operating load of the plant.

The outlet temperature of the combustion gas from the boiler is preferably controlled in order to control the outlet temperature of the gas turbine, thereby improving the plant efficiency.

In another embodiment, the plant has a conduit extending from the compressor to the boiler for the pressurized combustion air, a branch conduit from the conduit, an air expansion turbine connected to the branch conduit and flow control means for controlling flow in the branch conduit to the air expansion turbine, the flow control means being controlled to effect the control of at least one of the combustion air flow rate to the boiler and the operating pressure in the boiler.

Suitably, the plant has a sensor for at least one of temperature and pressure of the combustion gas at entry to the gas turbine, and the flow control means for the air expansion turbine is adjusted in dependence upon an output of the sensor, in order to maintain the combustion air flow rate and the operating pressure within a predetermined relationship to each other.

BRIEF DESCRIPTION OF THE DRAWINGS

Embodiments of the invention are described below by way of non-limitative example with reference to the accompanying diagrammatic drawings, wherein:

FIG. 3 is a graphical illustration of the relationship between air flow rate, combustion gas amount, and pressure supplied to a pressurized fluid bed combustion (P-FBC) boiler, with a constant fluidized velocity;

FIGS. 4, 6, 8, 10 and 12 are schematic views of pressurized fluidized bed combustion combined cycle power plants constructed in accordance with the present invention;

FIGS. 5, 7, 9, 11 and 13 are graphical illustrations depicting partial load characteristics of the combined cycle power plants of FIGS. 4, 6, 8, 10 and 12, respectively;

FIG. 40 is a graphical illustration of a temperature feedback control of the embodiment of FIG. 39.

DESCRIPTION OF PREFERRED EMBODIMENTS

Figure 1:
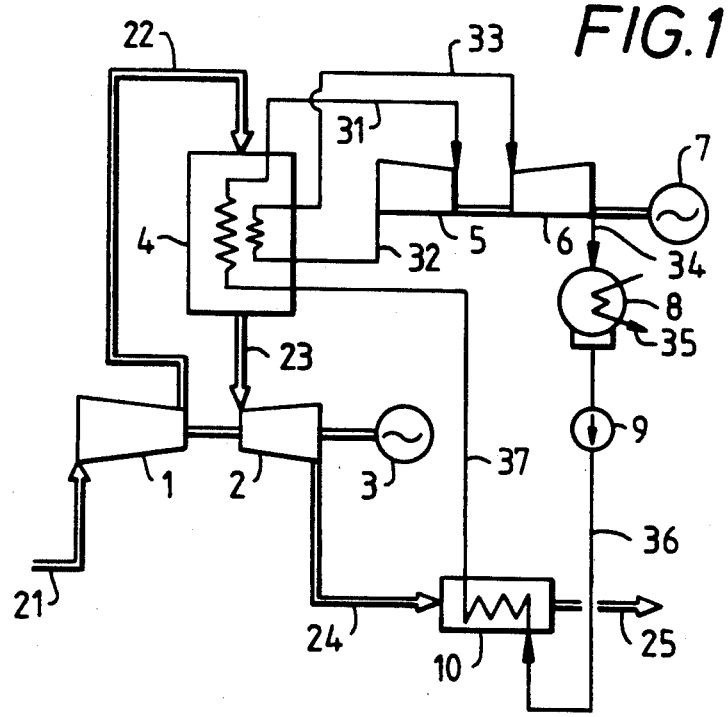
FIG. 1 is a schematic view of a pressurized fluidized bed combustion combined cycle power plant system incorporating a single-spindle type gas turbine to which the present invention is applied.

Referring now to the drawings wherein like reference numerals are used throughout the various views to designate like parts and, more particularly, to FIG. 1, according to this figure, a pressurized fluidized bed combustion boiler apparatus, a single spindle gas turbine apparatus, a steam turbine apparatus and a power plane apparatus.

Air 21, introduced into a gas turbine compressor 1 is pressurized to form high-pressure air 22 and is used to burn pulverized coal in a pressurized fluidized bed combustion boiler 4 so that the resultant high-temperature and high-pressure gases 23 expand to do work in the gas turbine 2, with the gas turbine 2 rotating a generator 3 to generate electric power. After this, the gas turbine exhaust gases 24 exchange heat with supply water 36 in a feed water heater 10 and are then released at a low temperature to the atmosphere as gas turbine exhaust. Due to requirements, e.g. of, electricity generation, the rotors of the gas turbine compressor 1, the gas turbine 2 and the generator 3 are all rotated at the same constant speed, being mounted on a single spindle.

On the other hand, the hot feed water 37 fed to the combustion boiler 4, is heated by the combustion in the combustion boiler 4 and fed, as high-temperature and high-pressure steam 31, to rotationally drive a high-pressure steam turbine 5. Then, the expanded low-temperature and low-pressure steam 32 is reheated by the combustion boiler 4. The resultant high-temperature and high-pressure steam 33 is fed to rotate a reheated steam turbine 6 so that electric power is generated by a steam turbine generator 7. The steam thus having worked in the steam turbine 6 is turned into low-temperature and low-pressure steam 34 and undergoes heat exchange with brine 35 in a steam condenser 8 so that the steam is condensed into water and collected in the steam condenser 8. This condensed water is boosted by a high-pressure water supply pump 9, which is disposed at the exit of the steam condenser 8, to be supplied to the feed water heater 10.

In the pressurized fluidized bed combustion combined cycle power plant thus constructed, the single-spindle gas turbine plant is adopted so that the full-load operation is effected by the principles thus far described. However, during a partial load operation the discharge air flow rate of the gas turbine compressor 1 is unchanged from that during the full load operation, since the spindle still rotates at the same speed. Thus, the pressure in the combustion boiler 4 during a partial load operation is not changed so that, in theory, a partial load run of the power plant cannot be performed.

On the other hand, in the combined cycle power plant having a boiling water type pressurized fluidized bed combustion boiler, to enable a partial load operation while maintaining the air/fuel ratio within a predetermined control range, the absolute amounts of air and fuel must be changed. To achieve the combustion reaction while maintaining the fluidization in a stable state, the ratios of the air flow rate for combustion use, the combustion gas flow rate in the boiler or the combustion gas flow rate at the outlet of the boiler to the pressures at these respective positions must be controlled to substantially the same ratio as at the full rated load over a predetermined control range, and the fluidization velocity in the reactor must be kept constant.

Figure 2:
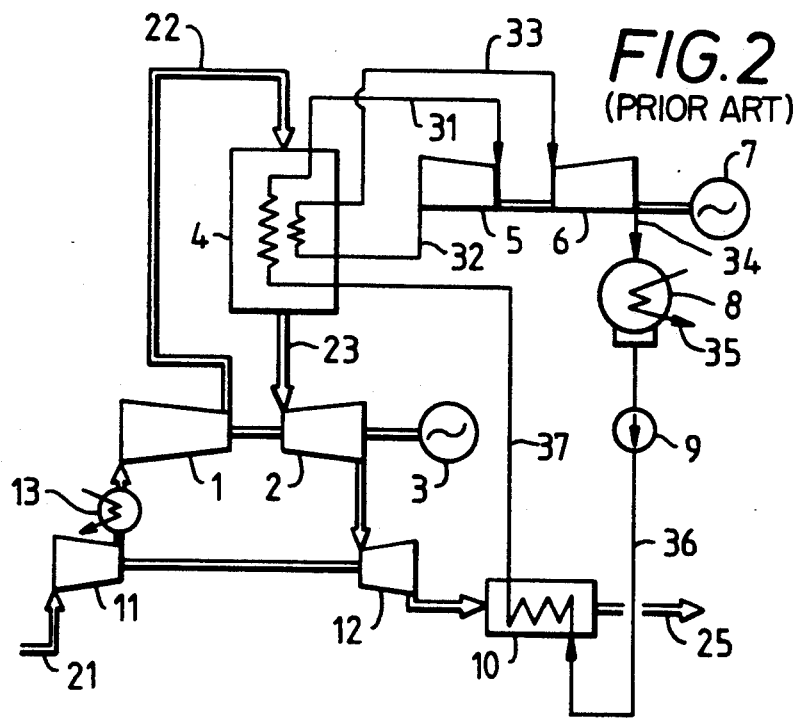
FIG. 2 is a schematic view of an example of a conventional pressurized fluidized bed combustion combined cycle power plant system double-spindle type gas turbine.

On the other hand, in the prior art plant of FIG. 2, using a double-spindle compressor/gas-turbine, a first compressor 1 and turbine 2 together with a generator 3, are provided on a first spindle and a second compressor 11 and second, low-pressure turbine 12 are provided on a second spindle. An intermediate cooler 13 is provided between the first and second compressors 1, 11. The compressed air flow 22 to the combustion boiler 4 can be varied by controlling the speed of the second compressor 11 and low pressure turbine 12.

FIG. 3 shows an ideal control condition of the coal-burning pressurized fluidized bed combustion (P-FBC) combustion boiler 4 of FIG. 1, in which a control range is established on both sides of a target control line representing a constant ratio of air flow rate/pressure or combustion gas flow rate/pressure over a range from full load to low load operation of the power plant. In this control range, stable performance of the P-FBC boiler is achieved.

FIGS. 4 to 39 show various ways in which control within the desired control range is achieved, over a load range. In the characteristics graphs, for example FIG. 5, the actual control achievable is compared with the desired control range.

Figure 5:
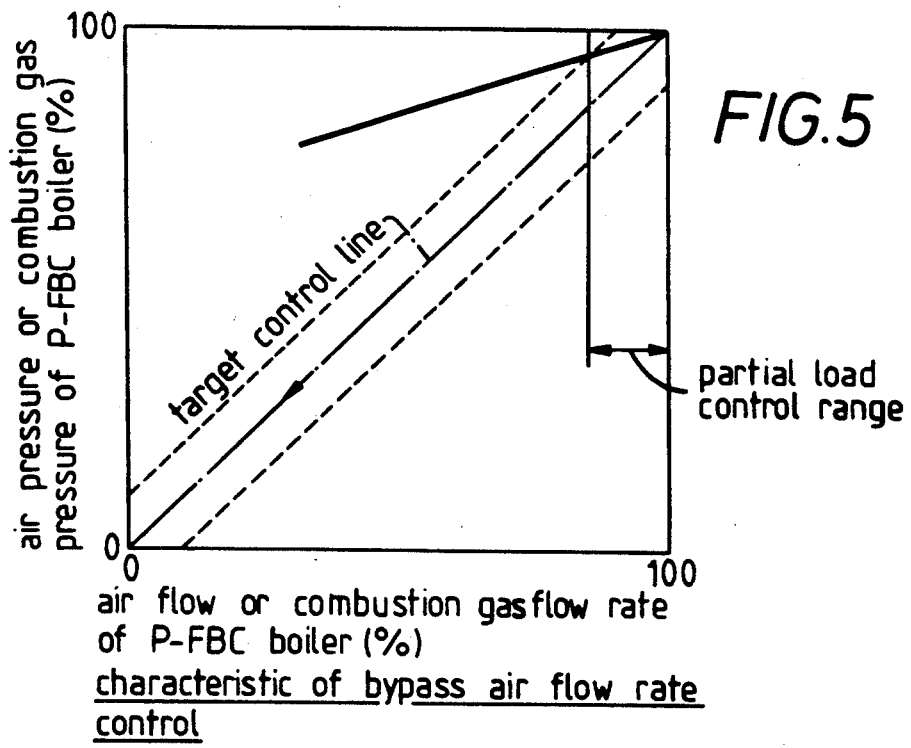

FIG. 4 is a schematic of a system in which a bypass valve 19, for adjusting air flow rate, is disposed between the combustion air flow 22 and the combustion gas flow 23, and FIG. 5 shows the control characteristic thereof. As is apparent from the drawing, the bypass air flow rate adjustment control shows a characteristic of (pressure/flow rate)≧1. Control within the desired control range is possible over a relatively small partial load control range.

Figure 6:
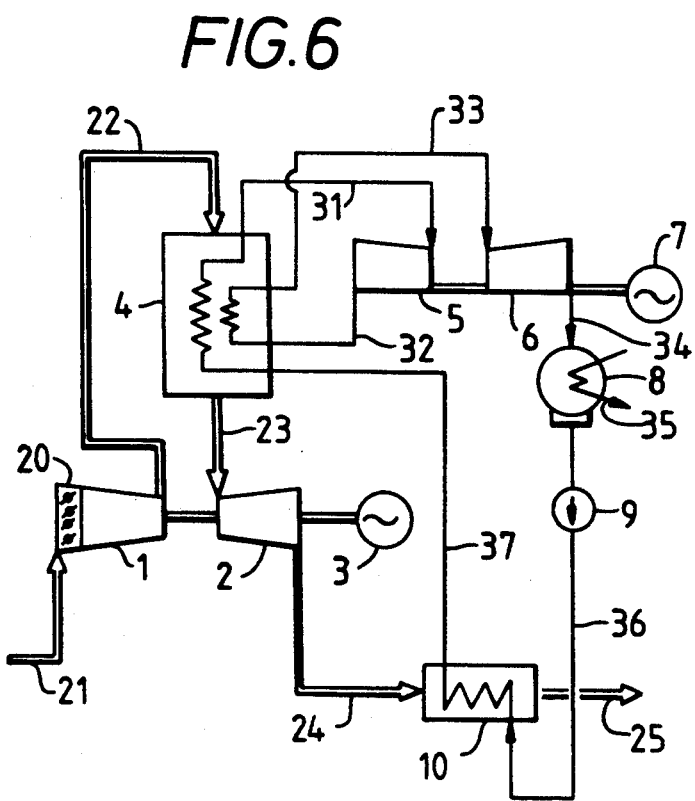
Figure 7:
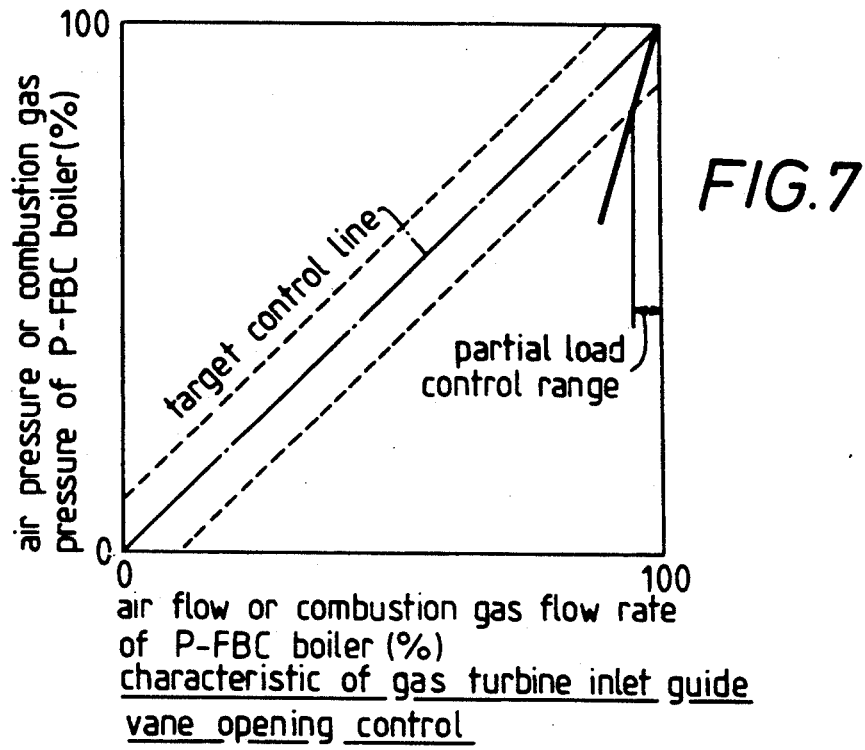

FIG. 6 is a schematic of a system in which a compressor inlet guide vane structure 20 is provided and opening control of the vane structure 20 is performed to control air flow rate, and FIG. 7 shows the control characteristic thereof. The gas turbine inlet guide vane opening control shows a characteristic of (pressure/flow rate)<1. Again the partial load control range is small.

Figure 8:
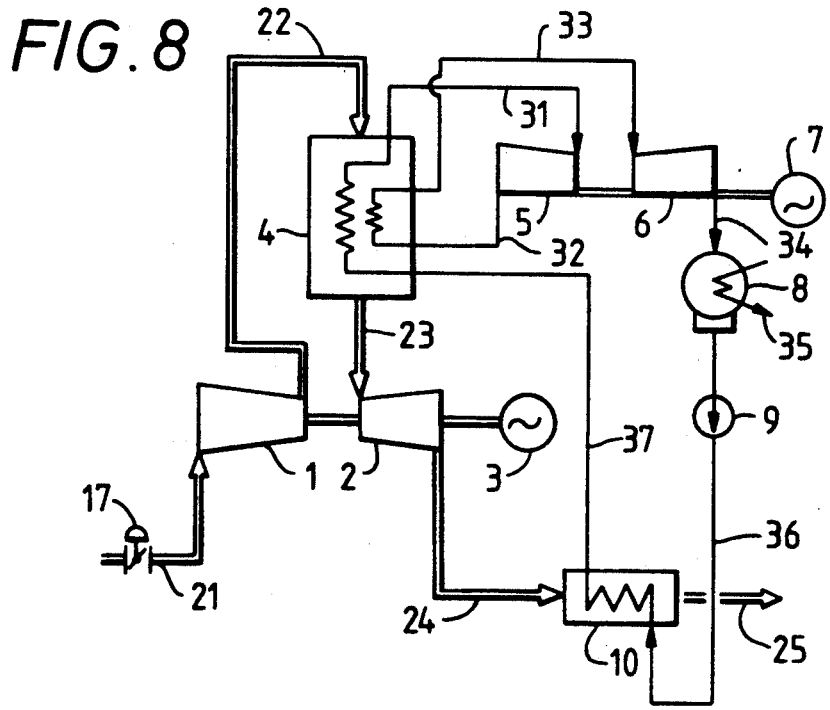

FIG. 8 is a schematic of a system in which a controlled throttle valve (throttle damper) 17 is disposed in the inlet air flow 21 to the compressor 1, and FIG. 9 shows the control characteristic thereof. Control by the throttle valve shows a characteristic of (pressure/flow rate)<1.

Figure 11:
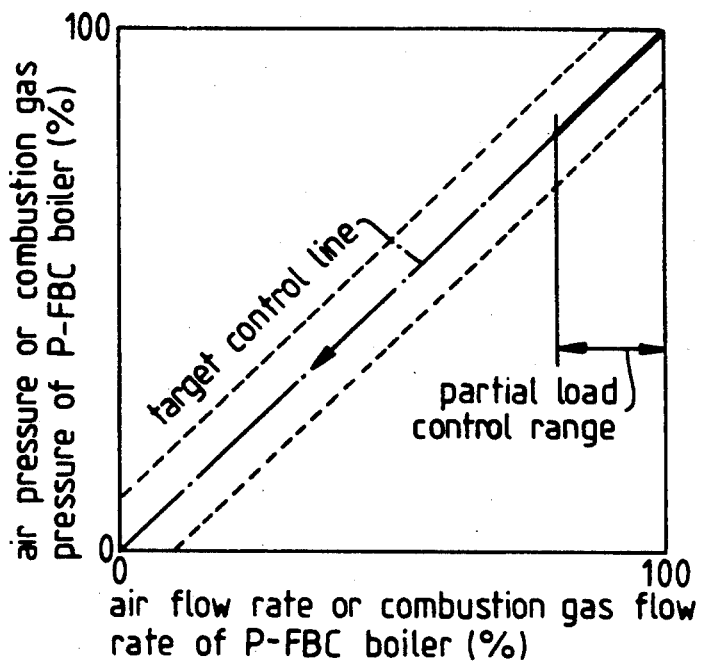

FIG. 10 is a schematic of a system in which control of air flow rate is performed by an expansion turbine 27 branching from the air flow 22, the flow rate being controlled by a valve 27a. FIG. 11 shows the control characteristic thereof. Control by means of the expansion turbine 27 shows a characteristic of (pressure/flow rate) about 1.

Figure 12:
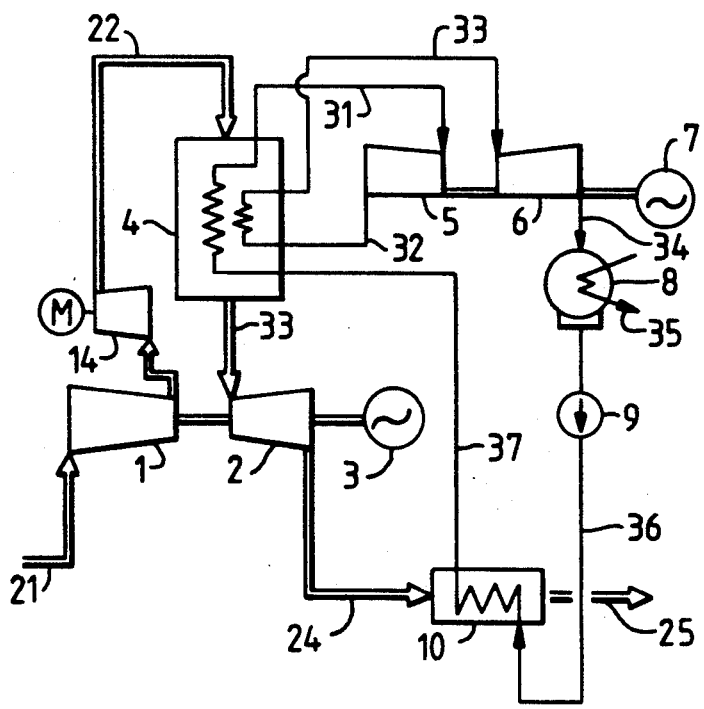
Figure 13:
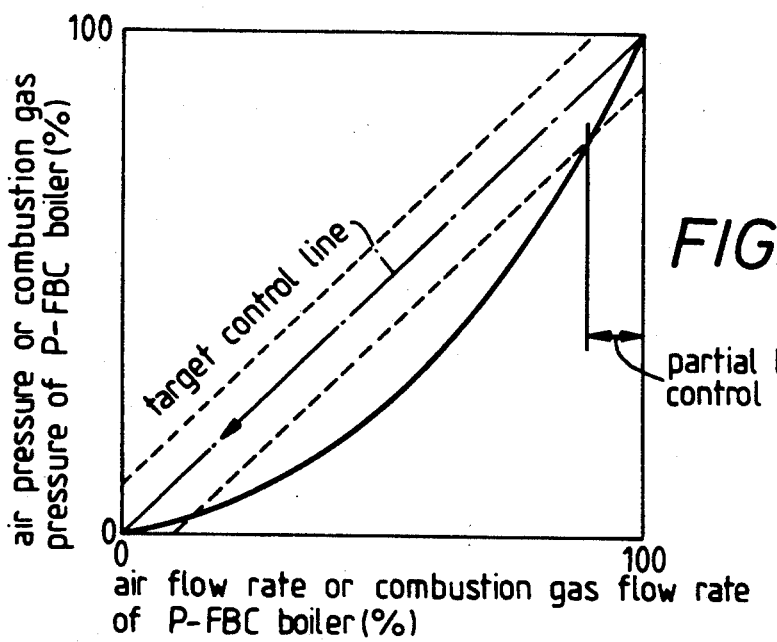

FIG. 12 shows is a schematic of a system in which control of air flow rate to the boiler 4 is achieved by a booster compressor 14 driven by an adjustable motor M and FIG. 13 shows the control characteristic thereof. Control by the booster compressor 14 shows a characteristic of (pressure/flow rate)<1, in the upper partial load region.

In the present invention it is preferred to combine two or more types of control elements, for example a control element associated with the relationship of pressure/flow rate≧1, and a control element associated with the relationship of pressure/flow rate≦1, to achieve a better control over a larger partial load range.

Figure 14:
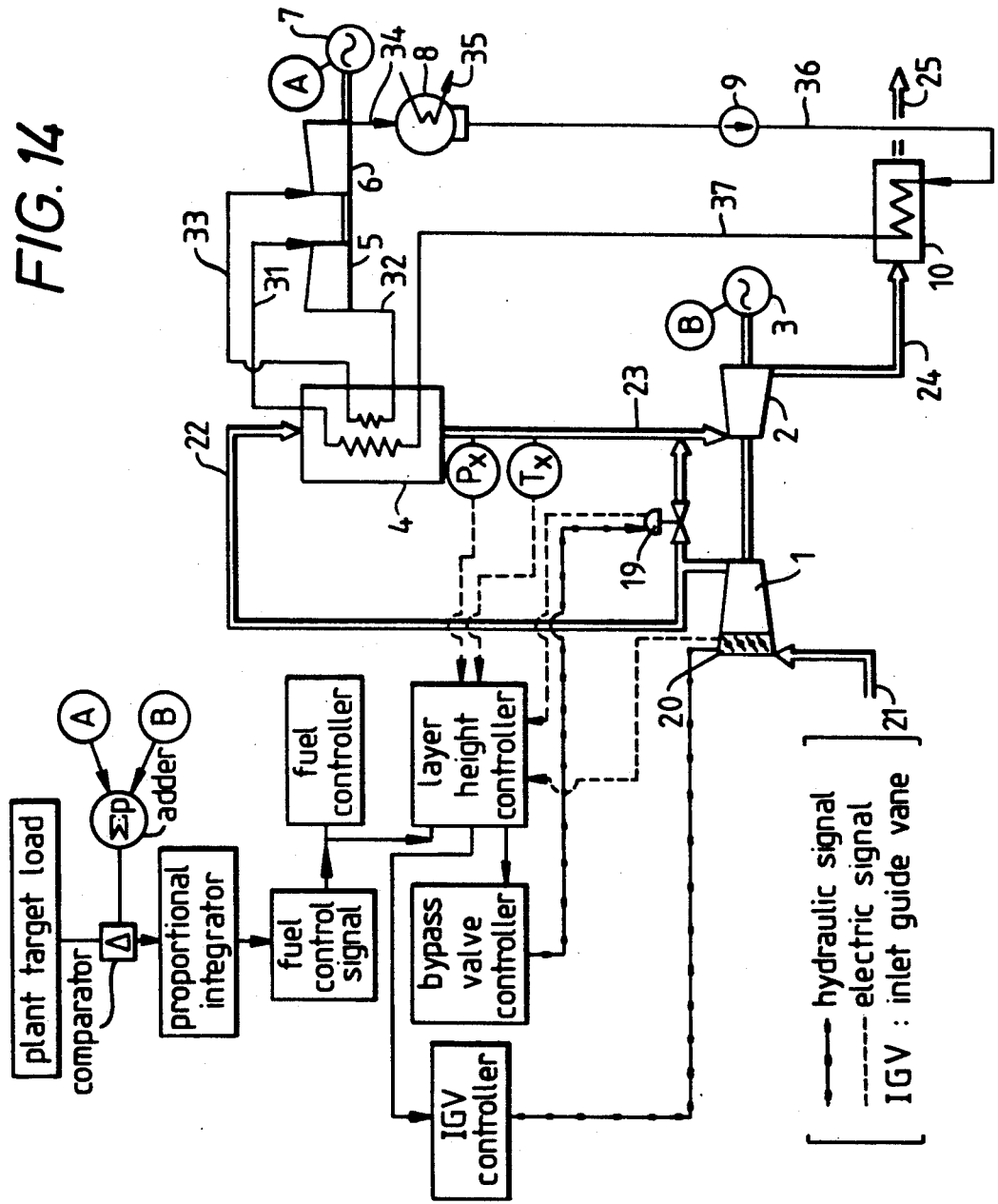
FIG. 14 is a schematic view of a further embodiment of a power plant of the present invention, with combined control of a compressor inlet guide vane structure and bypass valve.
Figure 15:
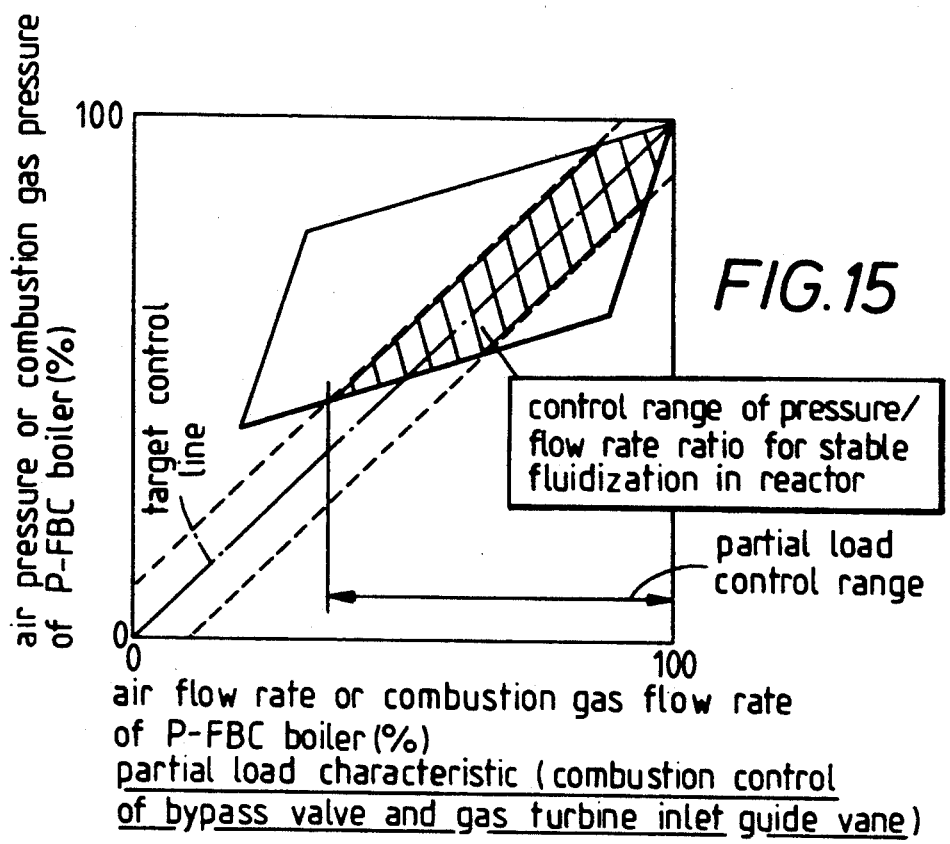
FIG. 15 is a graphical illustration of a partial load characteristic of the embodiment of FIG. 14.

FIG. 14 is a schematic of a system of a boiling water type pressurized fluidized bed combustion combined cycle power plant in which both a gas turbine compressor inlet guide vane structure 20 controlling the air flow rate at the inlet of the compressor 1 and an adjustable bypass valve 19 controlling the air flow rate supplied from the outlet of the compressor to the boiler are provided. FIG. 15 shows the partial load characteristic of the air flow rate supplied to the boiler 4 (or combustion gas flow rate) and the air pressure charged to the boiler 4 (or combustion gas pressure), when the gas turbine compressor inlet guide vane opening control and the bypass air flow rate control are combined. As will be seen from the drawing, by this control method control achieving stable fluidization in the boiler 4 within a predetermined ratio of pressure/flow rate is enabled over a wide partial load range.

The control method may be selected from the following methods:

(1) a control method performed within a predetermined control range in which a control unit having a relationship of (pressure/flow rate)≧1 precedes; in this case a control unit (air flow rate control with the bypass valve 19) having a relationship of (pressure/flow rate)≧1 is operated precedingly, and subsequently a control unit having a relationship of (pressure/flow rate)≦1 is operated;

(2) a control method performed within a predetermined control range in which a control unit having a relationship of (pressure/flow rate)≦1 precedes; in this case a control unit (air flow rate control with the compressor inlet guide vane structure 20) having a relationship of (pressure/flow rate)≦1 is operated precedingly, and subsequently a control unit having a relationship of (pressure/flow rate)≧1 is operated;

(3) a simultaneous control method performed within a predetermined control range in which a control unit having a relationship of (pressure/flow rate)≧1 and a control unit having a relationship of (pressure/flow rate)≦1 are controlled together;

(4) a control method performed within a predetermined control range in which the variation bands of the pressure and flow rate in a control unit having a relationship of (pressure/flow rate)≧1 and a control unit having a relationship of (pressure/flow rate)≦1 are varied and the control unit having the relationship of (pressure/flow rate)≦1 and the control unit having the relationship of (pressure/flow rate)≦1 are effected alternatively and repeatedly.

FIG. 14 also shows a schematic control system for the power plant. The steam turbine generator 7 end output A and gas turbine generator 3 end output B are integrated in an adder, and the difference between the total and a plant target load required at a central operation room is measured by a comparator. In a proportional integrator, load adjustment required to cause the difference measured at the comparator to be zero is effected, and a fuel control signal is sent to a fuel controller and a fluidized bed layer height controller. In the fuel controller, supply of coal is controlled in response to the load demand. In the layer height controller, layer height is controlled according to the load. Further, in order to control the air flow rate for combustion to the pressurized fluidized bed combustion boiler, control signals are sent to controllers of each of the compressor IGV 20 (inlet guide vane structure 20) and the compressor outlet air flow rate bypass valve 19. The IGV 20 and the bypass valve 19 send feedback signals to the IGV and the bypass valve controllers through the layer height controller so as to achieve an appropriate layer height. On the other hand, with layer height determined according to load and in order to maintain stable combustion, fluidization velocity must be kept constant, so that change of pressure detected by a sensor Px in the combustion gas of the pressurized fluidized bed combustion boiler 4 is detected under a condition of a constant layer temperature measured by a sensor Tx, and the detected pressure change is sent to the layer height controller, wherein flow rate and pressure are controlled so that fluidized velocity is constant.

Figure 16:
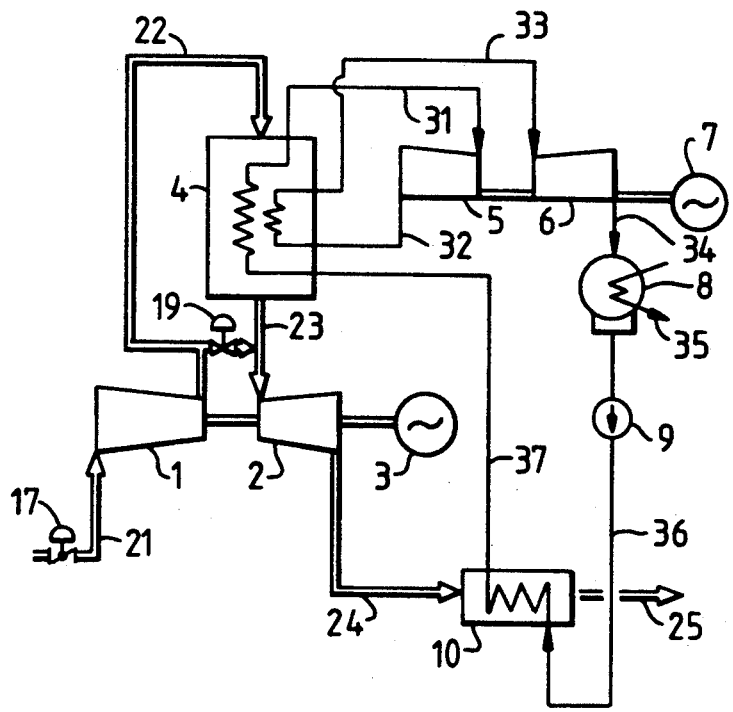
FIG. 16 is a schematic view of yet another embodiment of a power plant system of the present invention, with combined control of a throttle valve and bypass valve.
Figure 17:
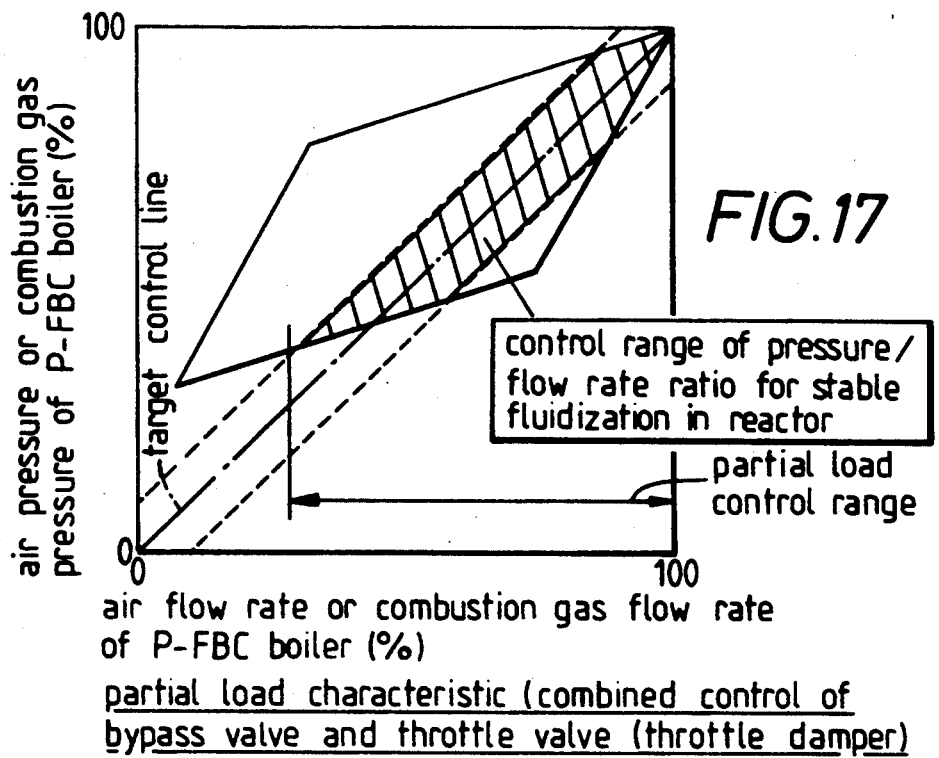
FIG. 17 is a graphical illustration of the partial load characteristics of the embodiment of FIG. 16.

FIG. 16 is a schematic of a power plant in which a throttle valve 17 (or throttle damper or throttle vane) for controlling the compressor inlet air pressure and a bypass valve 19 for controlling air flow rate supplied from the compressor outlet to the boiler are both provided. FIG. 17 shows the corresponding partial load characteristic of the air flow rate and the air pressure in the boiler when pressure control by the throttle valve 17 (or throttle damper or throttle vane) and flow rate control by the bypass valve 19 are combined. As in the embodiment of FIGS. 14 and 15, the control method can be selected from methods corresponding to the methods (1)-(4) outlined above. Control over a wide partial load range is obtainable.

The bypass valve 19 is a control unit of relationship (pressure/flow rate)≧1, and the throttle valve a control unit of relationship (pressure/flow rate) ≦1.

Figure 19:
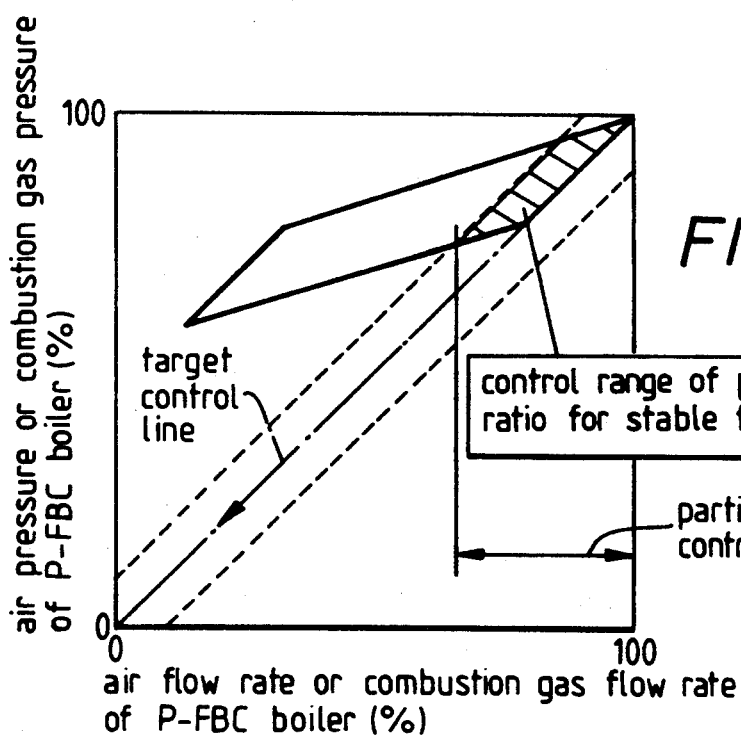
FIG. 19 is a graphical illustration of the partial load characteristics of the embodiment of FIG. 18.
Figure 18:
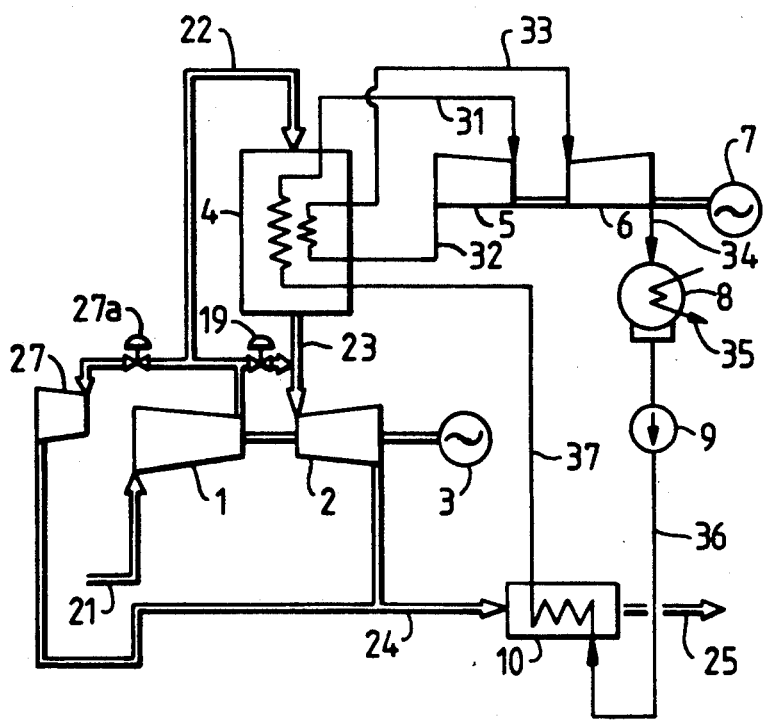
FIG. 18 is a schematic view of a further embodiment of a power plant system of the present invention, with combined control of an expansion turbine and a bypass valve.

FIG. 18 is a schematic of a system of a power plant which is provided with both an expansion turbine 27 disposed in a conduit line extracting the air flow from the outlet of the compressor 1 to a line other than the boiler supply line, and a bypass valve 19 controlling the supply air flow rate to the boiler from the outlet of the compressor. Flow control to the turbine 27 is effected by a valve 27a. FIG. 19 shows the corresponding partial load characteristic of the air flow rate and the air pressure when flow rate control by the expansion turbine 27 and flow rate control by the bypass valve 19 are combined. As in the embodiments of FIGS. 14 and 16, the control method can be selected to achieve a stable fluidization in the boiler 4, over a wide load range, using methods corresponding to methods (1)-(4) set out above.

Air flow rate control with the bypass valve 19 has a relationship (pressure/flow rate)≧1 and air flow rate control with the turbine 27 has a relationship (pressure/flow rate)≦1.

Figure 20:
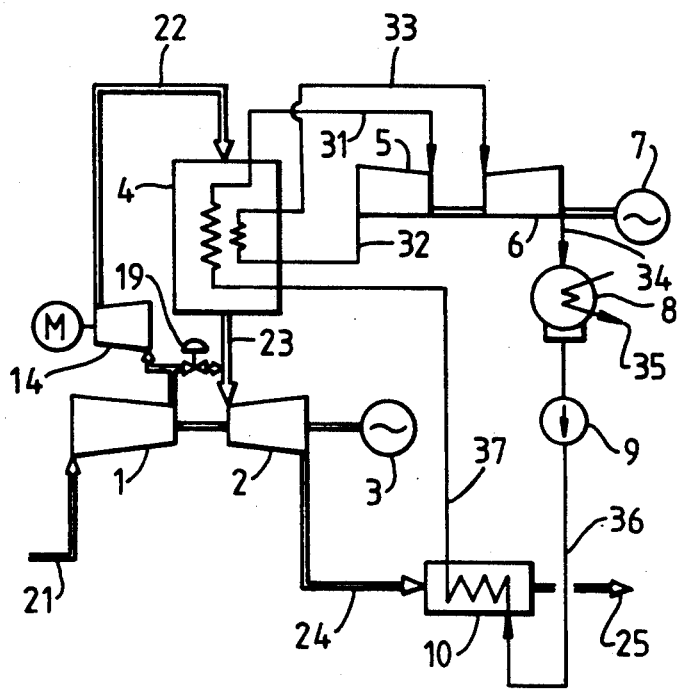
FIG. 20 is a schematic view of a still further embodiment of a power plant system of the present invention, with combined control of a booster compressor and a bypass valve.
Figure 21:
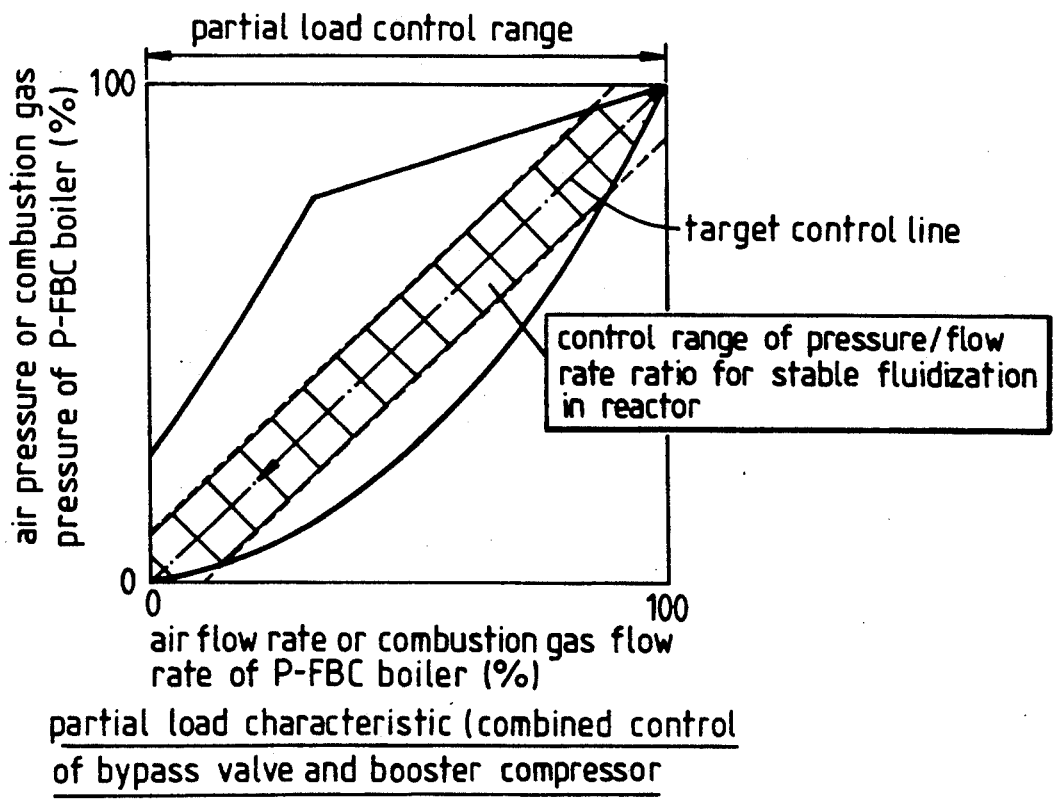
FIG. 21 is a graphical illustration of the partial load characteristics of the embodiment of FIG. 20.

FIG. 20 is a schematic of a system of a power plant which is provided with a booster compressor 14 controlling the air pressure charged to the boiler 4 from the outlet of the compressor 1 and the bypass valve 19 controlling the air flow rate supplied to the boiler 4 from the outlet of the compressor 1. The motor M of the booster partial load characteristic of the air flow rate and the air pressure when pressure control by the booster compressor 14 and flow rate control by the bypass valve 19 are combined. As in the embodiments of FIGS. 14, 16 and 18, control for achieving stable fluidization in the boiler 4 within a predetermined range of ratio of pressure/flow rate is enabled over a wide range, and the control method can be selected from methods corresponding to the methods (1)-4) set out above.

The air flow rate control with the bypass valve 19 has a relationship of (pressure/flow rate)≧1, while the pressure control by the booster 14 has a relationship of (pressure/flow rate)≦1.

Figure 22:
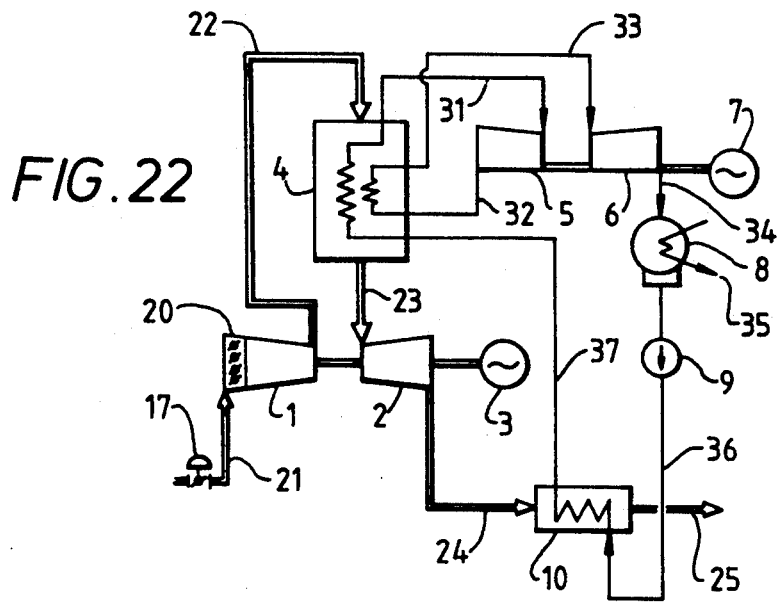
FIG. 22 is a schematic view of another embodiment of a power plant system of the present invention, with combined control of a throttle valve and a compressor inlet guide vane construction.
Figure 23:
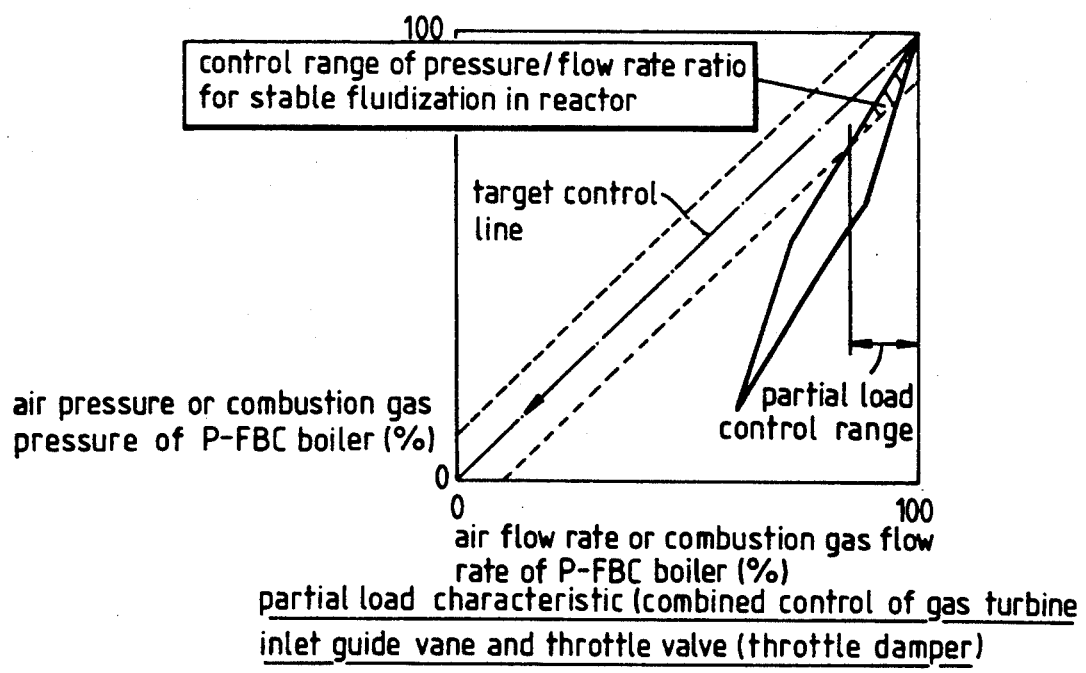
FIG. 23 is a graphical illustration of the partial load characteristics of the embodiment of FIG. 22.

FIG. 22 is a schematic of a system of a power plant which is provided with a gas turbine compressor inlet guide vane structure 20 controlling the air flow rate to the inlet of compressor 1 and a throttle valve 17 (or throttle damper, or throttle vane) controlling the air pressure at the compressor inlet. FIG. 23 shows the resulting partial load characteristic of the air flow rate supplied to the boiler 4 and the air pressure charged to the boiler 4, when flow rate control by the inlet guide vane structure 20 and pressure control by the throttle valve 17 (or throttle damper, or throttle vane) are combined. As in FIGS. 14 to 21, control achieving stable fluidization in the boiler 4 is enabled over a range from the rated load (100% air quantity) to a partial load level. In this case, the control method may be selected from:

(5) a control method performed within a predetermined control range in which a control unit having a relationship of (pressure/flow rate)≦1 precedes, e.g. flow rate control by the gas turbine compressor inlet guide vane opening or pressure control by the throttle vane (or throttle damper or throttle vane) having a relationship of (pressure/flow rate)≦1 is effected precedingly and subsequently, a control unit having a relationship of (pressure/flow rate)≧1 is effected;

(6) a control method performed within a predetermined control range in which the variation bands of the pressure and flow rate in a first control unit having a relationship of (pressure/flow rate)≦1 is varied and a second control unit having the relationship of (pressure/flow rate)≦1 is effected alternatively and repeatedly.

Figure 24:
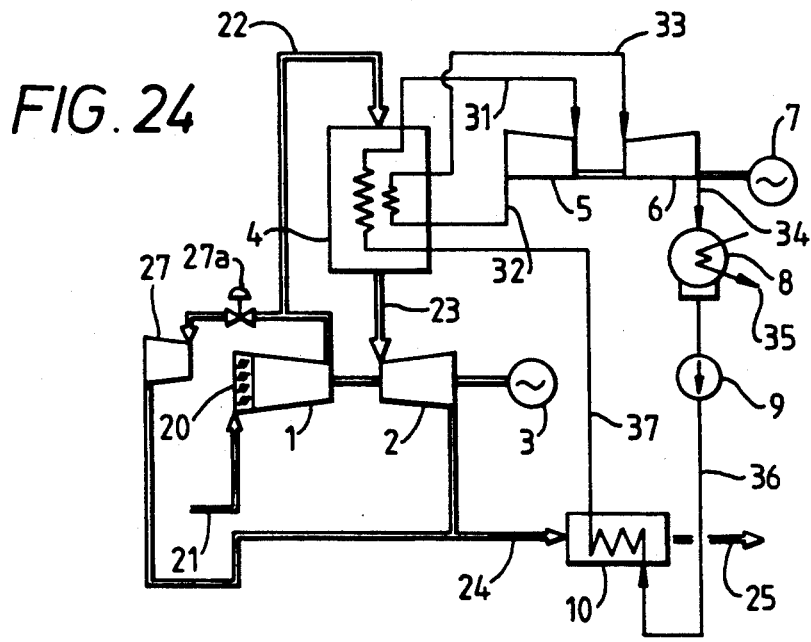
FIG. 24 is a schematic view of a further embodiment of a power plant system of the present invention, with combined control of a compressor inlet guide vane structure and an expansion turbine.
Figure 25:
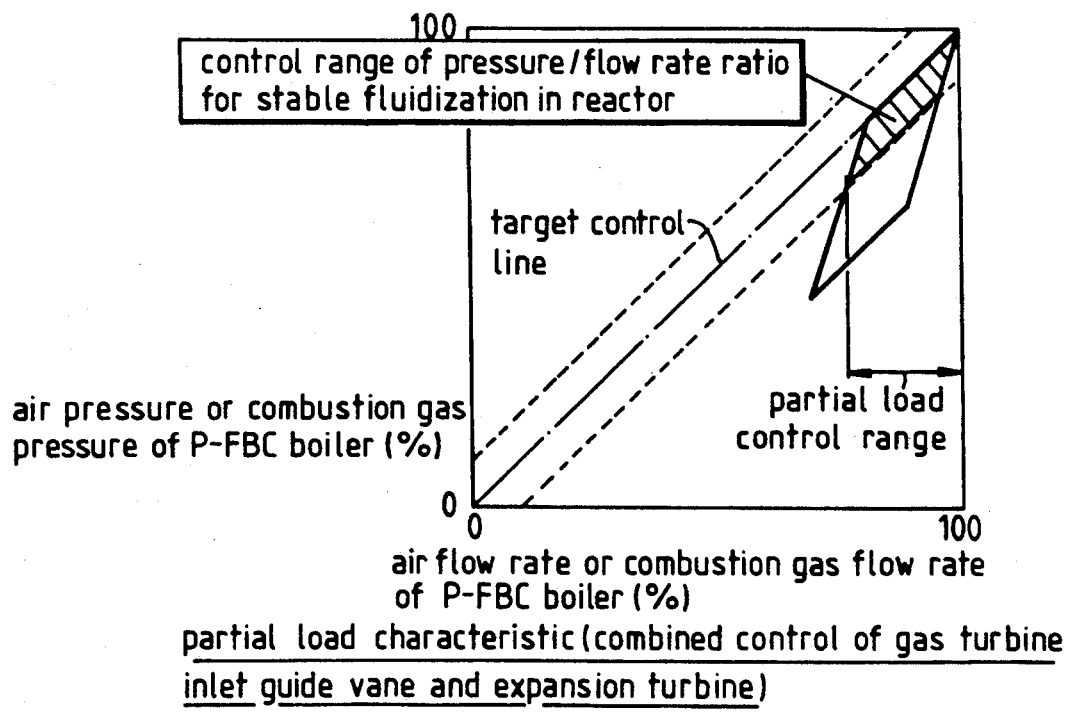
FIG. 25 is a graphical illustration of the partial load characteristics of the embodiment of FIG. 24.

FIG. 24 is a schematic of a system of a power plant provided with a gas turbine compressor inlet guide vane structure 20 controlling the air flow rate at the inlet of compressor 1 and an expansion turbine 27 with control valve 27a disposed in a conduit line extracting the air flow from the compressor outlet to a line other than the line 22 supplying the boiler 4. FIG. 25 shows the characteristic of the air flow rate supplied to the boiler 4 and the air pressure charged to the boiler 4 when air flow rate control by the inlet guide vane structure 20 and air flow rate control by the expansion turbine 27 are combined. FIG. 25 shows, that, as with the embodiments of FIGS. 14 to 23, by this control method, stable fluidization in the boiler 4 is obtainable over a partial load range from the rated load. The control method may be selected from methods corresponding to methods (1) to (4) set out above. Air flow rate control by the expansion turbine 27 has the relationship of (pressure/flow rate) ≧1 and air flow rate control by the inlet guide vane structure 20 has the relationship of (pressure/flow rate) ≦1.

Figure 26:
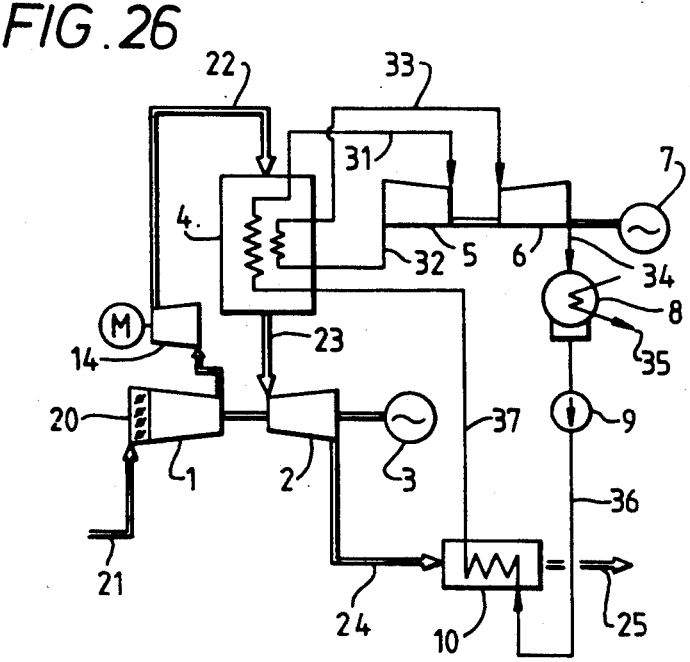
FIG. 26 is a schematic view of yet another embodiment of a power plant system of the present invention, with combined control of a compressor inlet guide vane construction and a booster compressor.
Figure 27:
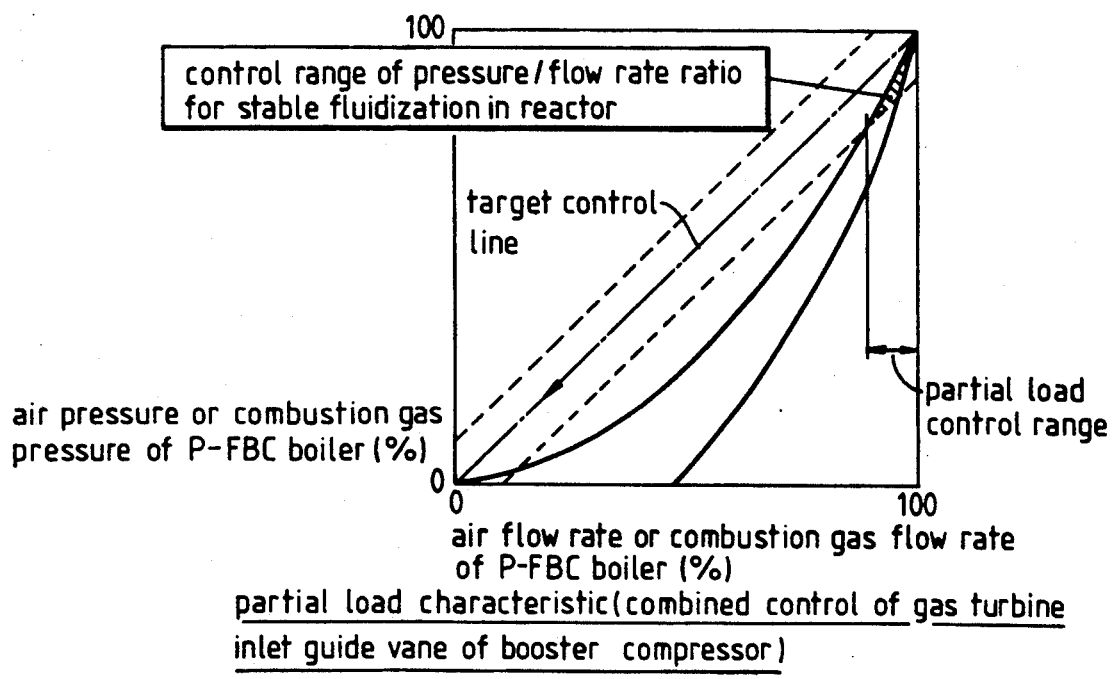
FIG. 27 is a graphical illustration of the partial load characteristics of the embodiment of FIG. 26.

FIG. 26 is a schematic of a system of a power plant provided with a gas turbine compressor inlet guide vane structure 20 controlling the air flow rate at the outlet of compressor 1 and the booster compressor 14 with motor M controlling the air pressure charged to the boiler 4 from the compressor outlet. FIG. 27 shows the characteristic of the air flow rate supplied to the boiler 4 and the air pressure charged to the boiler 4 when air flow rate control by the inlet guide vane opening control and pressure control by the booster compressor 14 are combined. In this case, stable fluidization in the boiler within a predetermined ratio of pressure/flow rate is enabled over a relatively small range. The control method can be selected from methods corresponding to methods (5) and (6) set out above. Both air flow rate control by the gas turbine inlet guide vane opening, and pressure control by the booster compressor have a relationship of (pressure/flow rate)≧1.

Figure 28:
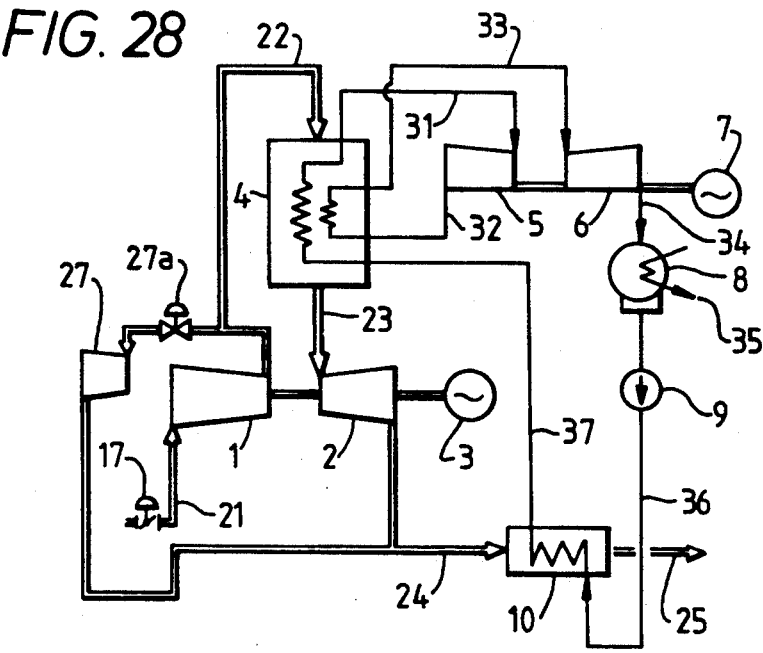
FIG. 28 is a schematic view of another embodiment of a power plant system of the present invention, with combined control of a throttle valve and an expansion turbine.
Figure 29:
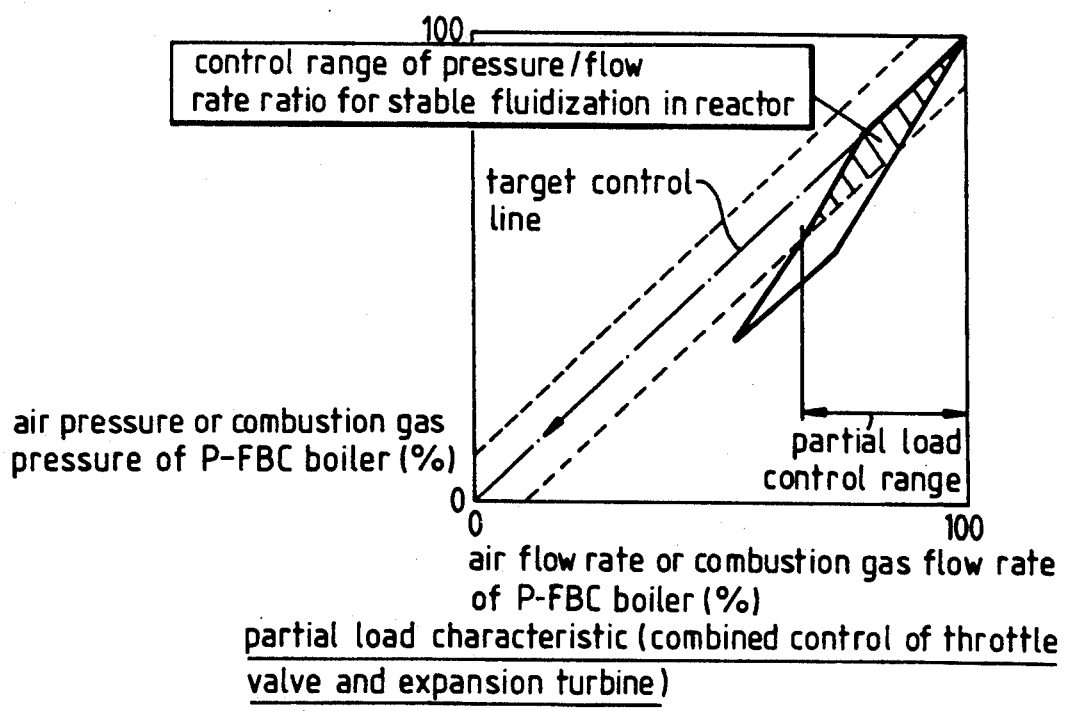
FIG. 29 is a graphical illustration of the partial load characteristics of the embodiment of FIG. 28.

FIG. 28 is a schematic of a system diagram of a power plant provided with a throttle valve 17 (or throttle damper, or throttle vane) controlling the air pressure at the inlet of compressor 1 and an expansion turbine 27 with valve 27a disposed at a conduit line through which the air flow from the compressor outlet is extracted to a line other the boiler supply line. FIG. 29 shows the characteristic of air flow rate supplied to the boiler 4 and air pressure charged to the boiler 4 when pressure control by the throttle valve 17 (or throttle damper, or throttle vane) and the flow rate control by the expansion turbine 27 are combined. Stable fluidization in the boiler within a predetermined ratio of pressure/flow rate is enabled over a range of partial load. The control method can be selected from methods corresponding to methods (1) to (4) set out above. Flow rate control by the expansion turbine 14 has a relationship of (pressure/flow rate)≧1, and pressure control by the throttle valve 17 (or throttle damper, or throttle vane) has a relationship of (pressure/flow rate) <=1.

Figure 30:
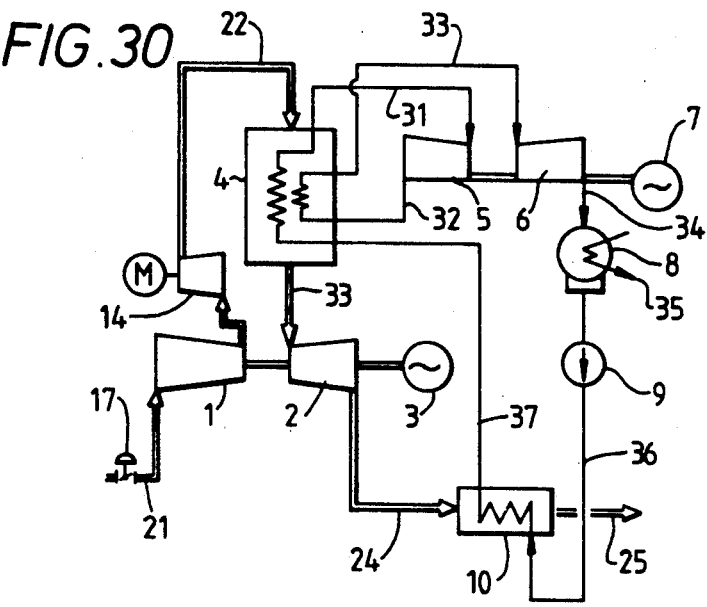
FIG. 30 is a schematic view of a further embodiment of a power plant system of the present invention, with combined control of a throttle valve and a booster compressor.
Figure 31:
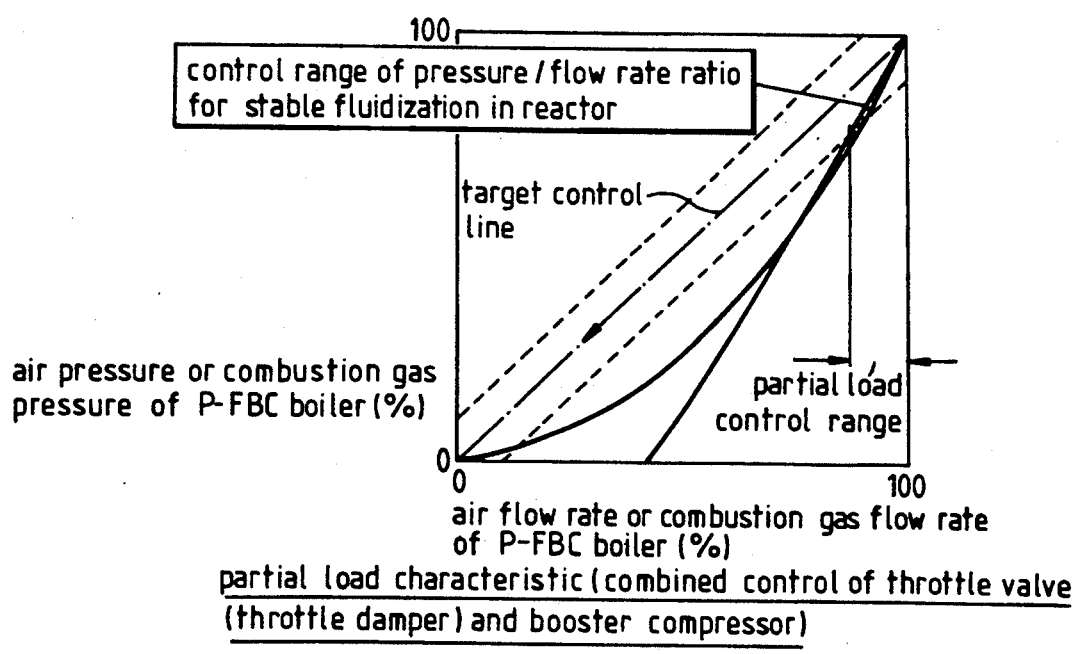
FIG. 31 is a graphical illustration of a partial load characteristic of the embodiment of FIG. 30.

FIG. 30 is a schematic of a system of a power plant provided with a throttle valve 17 (or throttle damper, or throttle vane) controlling the air pressure at the inlet of the compressor 1 and a booster compressor 14 driven by motor M controlling air pressure charged to the boiler 4 from the compressor outlet. FIG. 31 shows the characteristic of air flow rate supplied to the boiler 4 and air pressure charged to the boiler 4, when pressure control by the throttle valve 17 (or throttle damper, or throttle vane) and pressure control by the booster compressor 14 are combined. Stable fluidization in the boiler 4 is obtained within a predetermined ratio of pressure/flow rate over a relatively small partial load range. The control method may be selected from methods corresponding to methods corresponding to methods (5) and (6) set out above. Both the pressure control by the throttle valve 17 and the pressure control by the booster compressor 14 have a relationship of (pressure/flow rate) ≦1.

Figure 32:
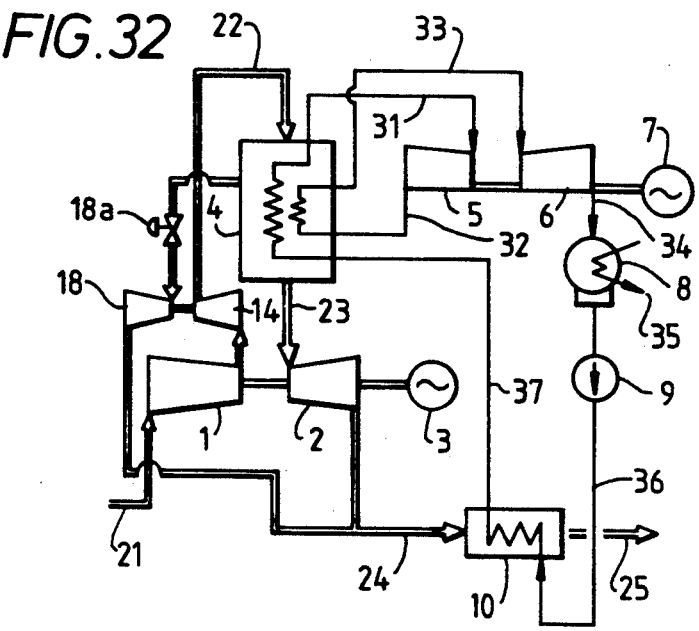
FIG. 32 is a schematic view of another embodiment of a power plant system of the present invention, with combined control of a booster compressor and an expansion turbine.
Figure 33:
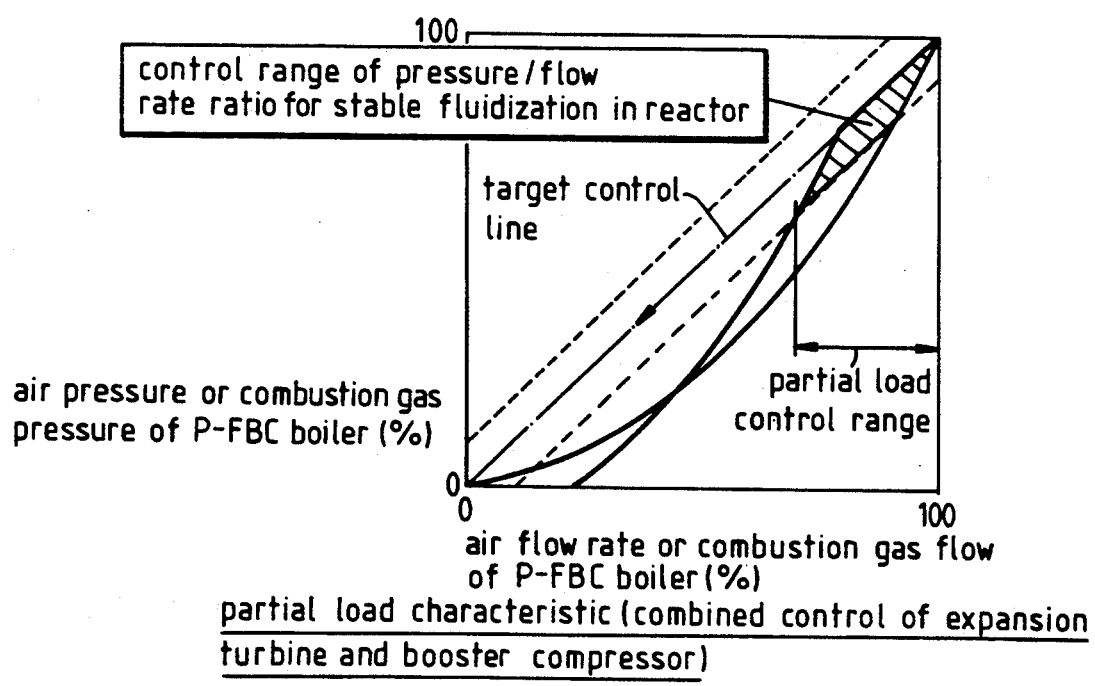
FIG. 33 is a graphical illustration of the partial load characteristics of the embodiment of FIG. 32.

FIG. 32 is a schematic of a system of a power plant provided with a booster compressor 14 driven by motor M controlling the air pressure charged to the boiler 4 from the outlet of compressor 1 and an expansion turbine 18 in a line connecting combustion gas in the boiler 4 to exhaust and by-passing the main turbine 2. The flow rate of combustion gas to the turbine 18 is controlled by valve 18a. The turbine 18 drives the booster compressor 14. FIG. 33 shows the characteristic of pressures and flow rates of the air supplied to the boiler 4 and the combustion gas in the boiler 4 when pressure control by the booster compressor 14 and flow rate control by expansion turbine control are combined. FIG. 33 shows that stable fluidization in the boiler 4 within a predetermined ratio of pressure/flow rate is enabled over a substantial partial load range. Over at least part of this range, the control method may be selected from methods corresponding to methods (1) to (4) set out above. Flow rate control by the expansion turbine 18 has a relationship of (pressure/flow rate)≧1 and pressure control by the booster compressor 14 has a relationship of (pressure/flow rate)≦1.

Figure 34:
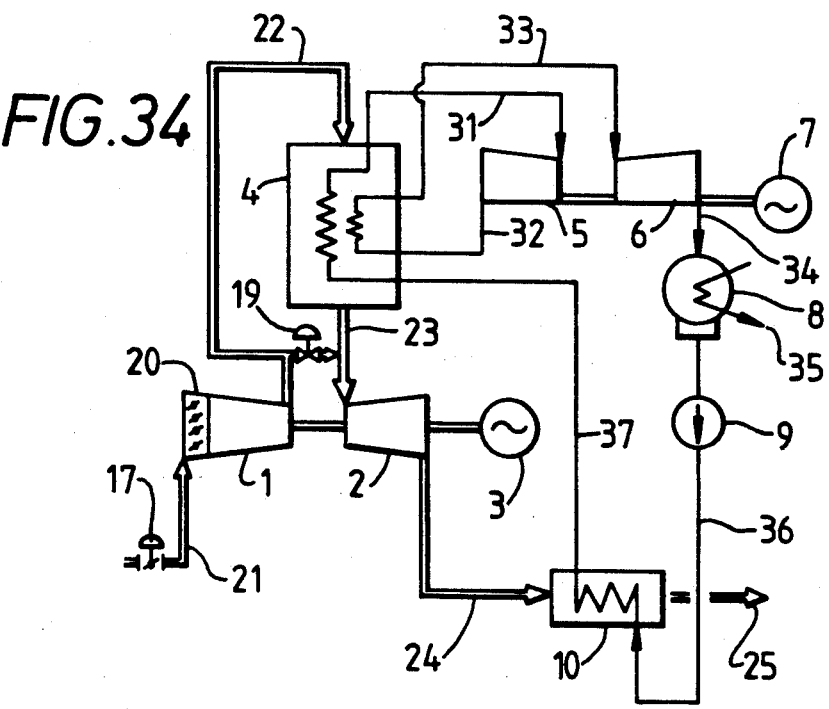
FIG. 34 is a schematic view of a still further embodiment of a power plant system of the present invention, with combined control of a throttle valve, a compressor inlet guide vane construction, a bypass valve and a boosting compressor.
Figure 35:
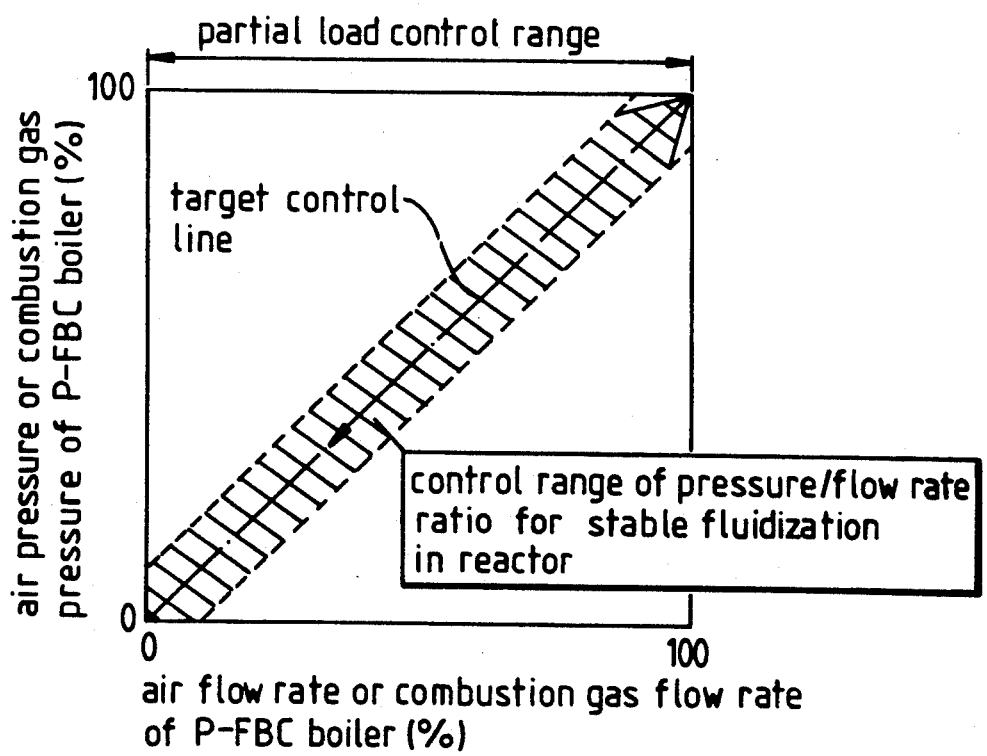
FIG. 35 is a graphical illustration of the partial load characteristics of the embodiment of FIG. 34.

FIG. 34 is a schematic of a system a power plant provided with a throttle valve 17 (or throttle damper, or throttle vane) controlling the air pressure at the outlet of compressor 1, a gas turbine compressor inlet guide vane structure 20 controlling the air flow rate at the outlet of compressor 1 and an adjustable bypass valve 19 controlling the air flow rate supplied to the boiler 4 from the compressor outlet. FIG. 35 shows the characteristic of flow rate and pressure of the air supplied to the reactor when pressure control by the throttle valve 17 (or throttle damper or throttle vane), flow rate control by the guide vane 20 opening control and flow rate control by the bypass valve 19 are combined. Stable fluidization in the boiler 4 within a predetermined ratio of pressure/flow rate is enabled over a wide partial load range. The control method may be selected from methods corresponding to methods (1) to (4) set out above. Flow rate control with the bypass valve 19 has a relationship of (pressure/flow rate)≧1, while pressure control by the throttle valve 17 (or throttle damper, or throttle vane) and flow rate control by inlet guide vane structure 20 have a relationship of (pressure/flow rate) ≦1.

Figure 36:
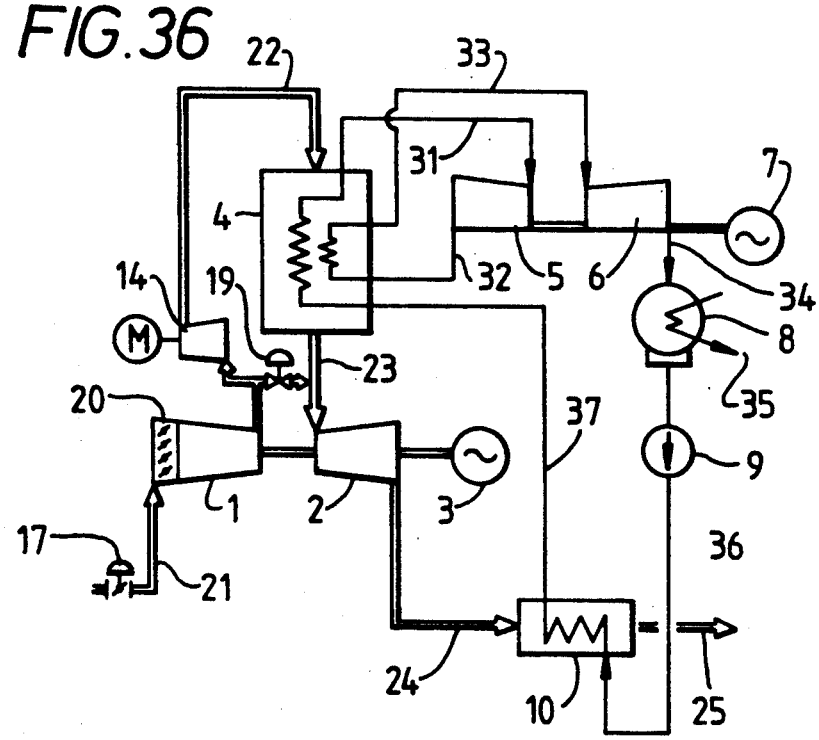
FIG. 36 is a schematic view of another embodiment of a power plant system of the present invention, with combined control of a throttle valve, a compressor inlet guide vane, a bypass valve structure and a booster compressor.

FIG. 36 is a schematic of a system of a power plant provided with a throttle valve 17 (or throttle damper, or throttle vane) controlling the air pressure at the inlet of compressor 1, a gas turbine compressor inlet guide vane structure 20 controlling the air flow rate at the compressor inlet, a bypass valve 19 controlling the air flow rate supplied to the boiler 4 from the compressor outlet, and a booster compressor 14 driven by a motor M controlling the air pressure charged ,to the boiler 4. FIG. 35 also shows the load characteristic of flow rate and pressure of the air supplied to the reactor when pressure control by the throttle valve 17 (throttle damper, or throttle vane), flow rate control by the guide vane 20 opening control, flow rate control by the bypass valve 19 and pressure control by the booster compressor 14 are combined. The control method can be selected from methods corresponding to methods (1) to (4) set out above.

Figure 37:
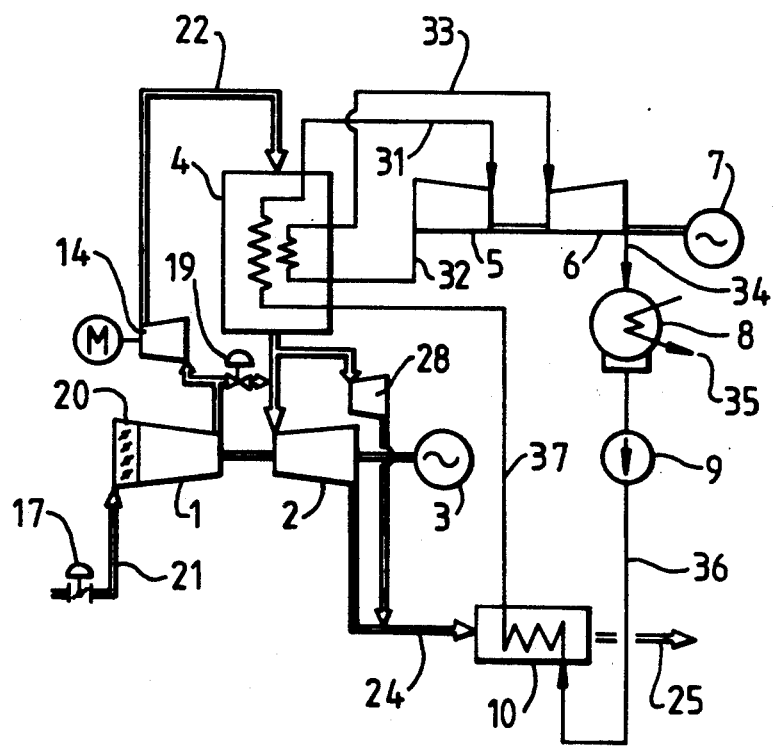
FIG. 37 is a schematic view of yet another embodiment of a power plant system of the present invention, with combined control of a throttle valve, a compressor inlet guide vane structure, a bypass valve, a booster compressor and an expansion turbine.

FIG. 37 is a schematic of a system of a power plant provided with a throttle valve 17 (or throttle damper, or throttle vane) controlling the air pressure at the inlet of compressor 1, a gas turbine compressor inlet guide vane structure 20 controlling the air flow rate at the inlet of compressor 1, an adjustable bypass valve 19 controlling the air flow rate supplied to the boiler 4 from the compressor outlet, a booster compressor 14 driven by a motor M controlling the air pressure charged to the boiler 4, and an expansion turbine 28 disposed in a conduit line through which exhaust gas from the boiler outlet is extracted, bypassing the main expansion turbine 2 connected to a compressor 1 for air supply for the boiler. The flow rate to the turbine 28 is controlled by an adjustable valve, not shown. FIG. 35 also shows the characteristic of flow rate and pressure of the air and combustion gas of the boiler 4 when pressure control by means of the throttle valve 17 (or throttle damper, or throttle vane), flow rate control by means of the inlet guide vane 20 opening control, flow rate control by means of the bypass valve 19, pressure control by means of the booster compressor 14, and flow rate control by means of the expansion turbine 28 are combined. The control method can be selected from the methods corresponding to the methods (1) to (4) above.

Figure 38:
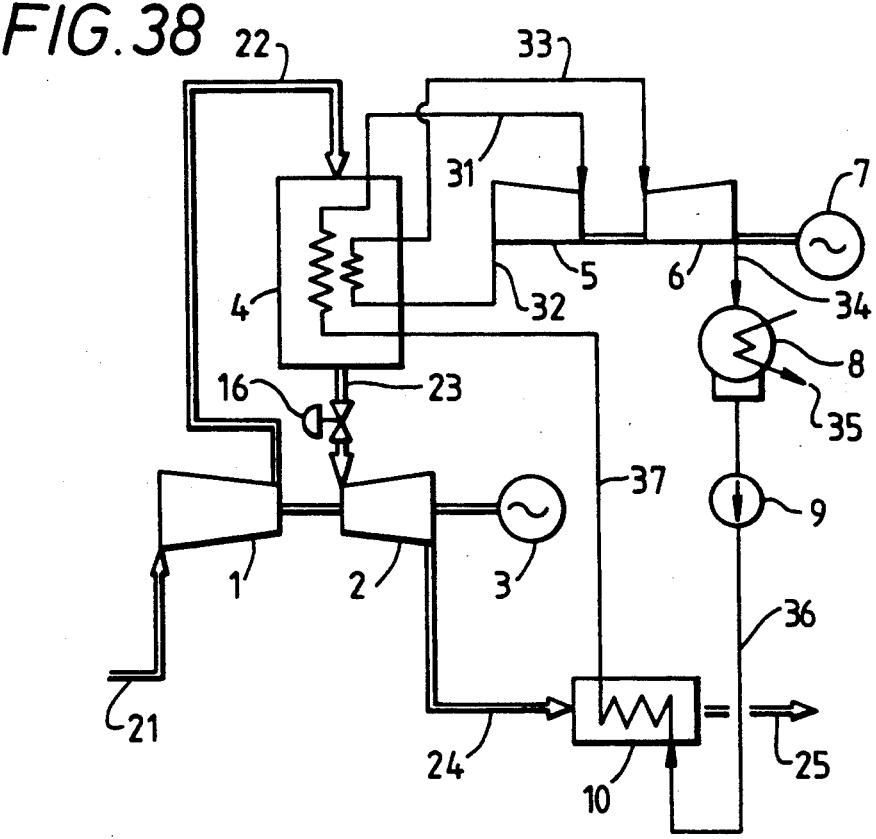
FIG. 38 is a schematic view of a still further embodiment of a power plant system of the present invention, with control of an inlet flow rate to the main expansion turbine.
Figure 39:
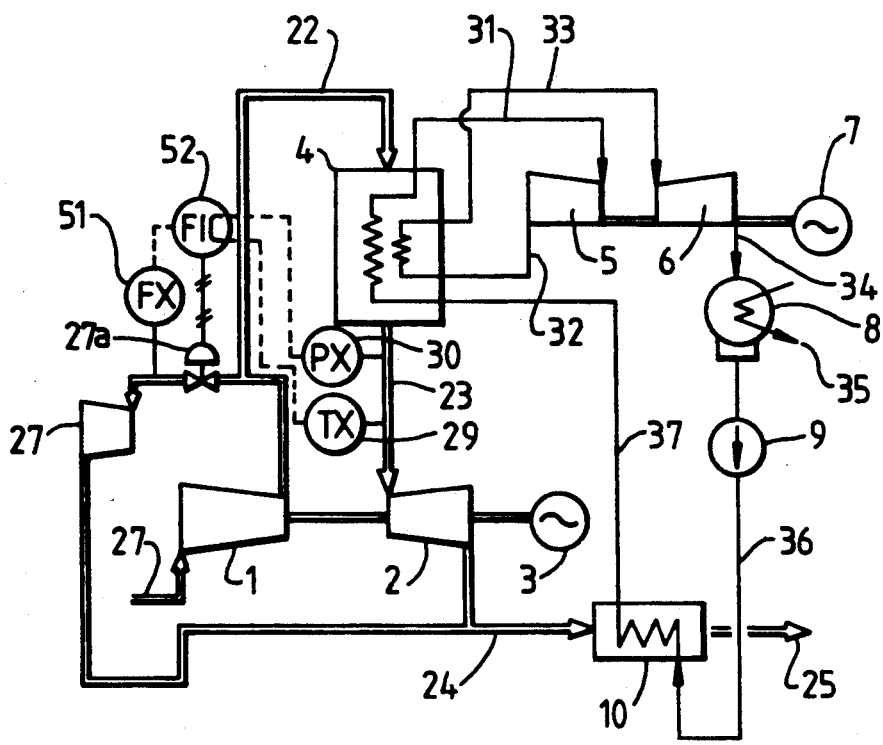
FIG. 39 is a schematic view of another embodiment of a power plant system of the present invention, similar to FIG. 10, with a temperature feedback control.

FIG. 38 is a schematic of another power plant of the invention, in which control of pressure and/or flow rate in the boiler 4 is achieved by control of the passage resistance at the entrance of the main turbine 2. An adjustable valve 16 controls the rate of flow 23 of the combustion gases from the boiler 4 to the turbine 2, thereby achieving adjustment of pressure and/or flow rate in the boiler, FIG. 39 is a schematic of a modified version of the plant of FIG. 10, in which the temperature Tx and the pressure Px in the combustion gas flow 23 are measured by sensors 29 and 30 and the resultant signals are fed to a controller 52 for the adjustable valve 27a which controls the flow rate of air through the auxiliary air-driven turbine 27, in order to adjust the air flow rate to the boiler 4. The flow rate Fx to the turbine 27 is measured by sensor 51 and also fed to the controller 52, so that the desired flow rate to the boiler 4 can be set by adjustment of the valve 27a.

The embodiment of FIG. 39 enables the temperature control of the combustion gas input to the turbine 2. This is an important advantage, because the power output of the gas turbine 2 varies in dependence upon the gas turbine compressor pressure ratio. It is desirable to operate the gas turbine so as to achieve maximum power output, i.e. to select the appropriate gas turbine compressor pressure ratio for maximum power output. FIG. 40 illustrates this, and shows that, at different gas turbine entrance temperatures the appropriate gas turbine compressor pressure ratio (i.e. the pressure ratio at the peak of the curve) is different. The chain-dot curve in FIG. 40 is the optimum curve for the ratio of the gas turbine output to the gas turbine compressor pressure ratio. Thus the gas turbine compressor pressure ratio should be selected, for the given gas turbine entrance temperature, to achieve the maximum gas turbine output. The arrangement of FIG. 39 permits this.

In FIG. 40, the gas turbine output and the gas turbine compressor pressure ratio are expressed in percentages, relative to the value (100%) at the reference gas turbine entrance temperature $T_1$.

What is claimed is:

1. A pressurized fluidized bed combustion combined cycle power plant comprising:
   a pressurized fluidized bed combustion boiler means for burning coal and producing steam by combustion heat and including a combustion chamber in which said coal is burned;
   a gas turbine unit including a gas turbine driven by combustion gas from burning of said coal in said boiler means, a spindle rotated at a constant speed by said turbine, an electrical generator driven at a constant speed by said spindle, a compressor means on said spindle for supplying compressed combustion air to said boiler means for burning the coal;
   control means for controlling, in dependence upon an operating load of said boiler means, at least one of a flow rate of said combustion air into said boiler means, and an operating pressure in said combustion chamber of said boiler means and wherein said control means controls at least one of said combustion air flow rate and said operating pressure by adjustment of at least two adjusting means, and wherein each of said at least two adjusting means is adapted to adjust at least one of said combustion air flow rate and said operating pressure.

2. A power plant according to claim 1, wherein said control means controls at least one of said combustion air flow rate and said operating pressure in such a manner so as to maintain support of a combustion of coal in said boiler means over a load range of said boiler means from full load to less than 80% of full load.

3. A power plant said power plant comprising:
   a pressurized fluidized bed combustion boiler means for burning coal and producing steam by combustion heat and including a combustion chamber in which said coal is burned;
   a gas turbine unit including a gas turbine driven by combustion gas from burning of said coal in said boiler means, a spindle rotated at a constant speed by said turbine, an electrical generator driven at a constant speed by said spindle, a compressor means on said spindle for supplying compressed combustion air to said boiler means for burning the coal;
   control means for controlling, in dependence upon an operating load of said boiler means, at least one of a flow rate of said combustion air into said boiler means, and an operating pressure in said combustion chamber of said boiler means, and
   conduit means extending from said compressor means to said boiler means for supplying said compressed combustion air to said boiler means, a booster compressor means for boosting pressure of said combustion air in said conduit means, and drive means for driving said booster compressor means, said control means controlling said drive means so as to effect control of at least one of said combustion air flow rate and said operating pressure.

4. A power plant according to claim 1, further comprising a conduit means for supplying air to said compressor means to be compressed therein, and adjustable flow resistance means in said conduit means, and wherein said control means controls said flow resistance means so as to effect control of said operating pressure.

5. A power plant according to claim 1, further comprising a conduit means extending from said compressor means to said boiler means for supplying said compressed combustion air, a branch conduit branching from said conduit means, an air expansion turbine connected to said conduit means by said branch conduit, and flow control means for controlling flow in said branch conduit to said air expansion turbine, and wherein said control means controls said flow control means to effect control of at least one of said combustion air flow rate and said operating pressure.

6. A power plant according to claim 5, further comprising a sensor means for sensing at least one of temperature and pressure of said combustion gas at entry to said gas turbine, and wherein said control means effects adjustment of said flow control means in dependence upon an output of said sensor means to maintain said combustion air flow rate and said operating pressure within a predetermined relationship with respect to each other.

7. A power plant comprising a pressurized fluidized bed combustion boiler means for burning coal and producing steam by combustion heat and including a combustion chamber in which said coal is burned;
   a gas turbine unit including a gas turbine driven by combustion gas from burning of said coal in said boiler means, a spindle rotated at a constant speed by said turbine, an electrical generator driven at a constant speed by said spindle, a compressor means on said spindle for supplying compressed combustion air to said boiler means for burning the coal;
   control means for controlling, in dependence upon an operating load of said boiler means, at least one of a flow rate of said combustion air into said boiler means, and an operating pressure in said combustion chamber of said boiler means; and
   adjustable vanes for controlling air flow rate into said compressor means, a first conduit means extending from said compressor to said boiler means for supplying said compressed combustion air to said boiler means, a second conduit means extending from said boiler means to said gas turbine for supplying said combustion gas to said gas turbine, and a by-pass means for connecting said first conduit means to said second conduit means, and flow control means for controlling an air flow rate in said by-pass means, and wherein said control means controls at least one of said adjustable vanes and said flow control means of said by-pass means to control at least one of said combustion air flow rate and said operating pressure.

8. A method of operating a pressurized fluidized bed combustion combined cycle power plant, said power plant comprising a pressurized fluidized bed combustion boiler means for burning coal and producing steam by combustion heat and including a combustion chamber in which said coal is burned; a gas turbine unit including a gas turbine driven by combustion gas from burning of said coal in said boiler means, a single spindle rotated at a constant speed by said gas turbine, an electrical generator driven at a constant speed by said single spindle, a compressor means on said single spindle for supplying compressed combustion air to said boiler means for burning of said coal, said method comprising the steps of:

operating said power plant, and controlling, during operation of said power plant, at least one of a flow rate of said combustion air into said boiler means, and an operating pressure in said combustion chamber of said boiler means in dependence upon the operating load of said boiler means and, wherein at least one of said combustion air flow rate and said operating pressure is controlled during the controlling step by adjustment of at least two adjusting means, with each of said at least two adjusting means being adapted to adjust at least one of said combustion air flow rate and said operating pressure.

9. A method according to claim 8, wherein at least one of said combustion air flow rate and said operating pressure is controlled during the step of controlling in such a manner so as to maintain support of combustion of said coal in said boiler means over a load range of said boiler means from a full load to less than 80% of a full load operation.

10. A method of operating a pressurized fluidized bed combustion combined cycle power plant, said power plant comprising a pressurized fluidized bed combustion boiler means for burning coal and producing steam by combustion heat and including a combustion chamber in which said coal is burned, a gas turbine unit including a gas turbine driven by combustion gas from burning of said coal in said boiler means, a single spindle rotated at a constant speed by said gas turbine, an electrical generator driven at a constant speed by said single spindle, a compressor means on said single spindle for supplying compressed combustion air to said boiler means for burning of said coal, said method comprising the steps of:

operating said power plant, and controlling, during operation of said power plant, at least one of a flow rate of said combustion air into said boiler means, and an operating pressure in said combustion chamber of said boiler means in dependence upon the operating load of said boiler means, and wherein said power plant further comprising a conduit means extending from said compressor means to said boiler means for supplying said combustion air to said boiler means, a booster compressor means for boosting pressure of said combustion air in said conduit means and drive means for driving said booster compressor means, and wherein said step of controlling includes controlling said drive means so as to effect control of at least one of said combustion air flow rate and said operating pressure.

11. A method according to claim 8, wherein said power plant further comprises a conduit means for supplying air to said compressor means to be compressed therein, and adjustable flow resistance means in said conduit means, and wherein said step of controlling includes controlling said flow resistance means so as to effect control of said operating pressure.

12. A method according to claim 8, wherein said power plant further comprises a conduit means extending from said compressor means to said boiler means for supplying said compressed combustion air to said boiler means, a branch conduit branching from said conduit means, an air expansion turbine connected to said conduit means by said branch conduit, and flow control means for controlling flow in said branch conduit to said air expansion turbine, and wherein said step of controlling includes controlling said flow control means to effect control of at least one of said combustion air flow rate and said operating pressure.

13. A method according to claim 12, wherein said power plant further comprises a sensor means for sensing at least one of temperature and pressure of said combustion gas at an entry to said gas turbine, and wherein said step of controlling includes adjusting said flow control means for said air expansion turbine in dependence upon an output of said sensor means to maintain said combustion air flow rate and said operating pressure within a predetermined relationship with respect to each other.

14. A method of operating a pressurized fluidized bed combustion combined cycle power plant, said power plant comprising a pressurized fluidized bed combustion boiler means for burning coal and producing steam by combustion heat and including a combustion chamber in which said coal is burned, a gas turbine unit including a gas turbine driven by combustion gas from burning of said coal in said boiler means, a single spindle rotated at a constant speed by said gas turbine, an electrical generator driven at a constant speed by said single spindle, a compressor means on said single spindle for supplying compressed combustion air to said boiler means for burning of said coal, said method comprising the steps of:

operating said power plant, and controlling, during operation of said power plant, at least one of a flow rate of said combustion air into said boiler means, and an operating pressure in said combustion chamber of said boiler means in dependence upon the operating load of said boiler means, and wherein said power plant further comprises adjustable vanes for controlling an air flow rate into said compressor means, a first conduit means extending from said compressor means to said boiler means for supplying said compressed combustion air to said boiler means, a second conduit means extending from said boiler means to said gas turbine for supplying said combustion gas to said gas turbine, a by-pass means for connecting said first conduit means to said second conduit means, and flow control means for controlling an air flow rate in said by-pass means, and wherein said step for controlling includes controlling at least one of said adjustable vanes and said flow control means of said by-pass means to control at least one of said combustion air flow rate and said operating pressure.

15. Method according to claim 14 wherein said controlling of said adjustable vanes includes adjusting at least one of said adjusting vanes to control the power plant operation over a first range of an operating load of the power plant, and adjusting said flow control means of said by-pass means to control the power plant operation over a seecond range of an operating load of the power plant, and wherein said first range is closer to a full operating load of the power plant than said second range.

16. Method according to claim 8, wherein the step of controlling at least one of said combustion air flow rate and said operating pressure controls a temperature of inlet gas to said gas turbine in dependence upon the operating load of the power plant.

17. A method according to claim 8, further comprising the step of controlling an outlet temperature of the combustion gas from said boiler means to control an outlet temperature of said gas turbine and improve efficiency of the power plant.

18. A method of operating a pressurized fluidized bed combustion combined cycle power plant, said power plant comprising a pressurized fluidized bed combustion boiler means for burning coal and producing steam by combustion heat and including a combustion chamber in which said coal is burned, a gas turbine unit including a gas turbine driven by combustion gas from burning of said coal in said boiler means, a single spindle rotated at a constant speed by said gas turbine, an electrical generator driven at a constant speed by said single spindle, a compressor means on said single spindle for supplying compressed combustion air to said boiler means for burning of said coal, said method comprising the steps of:
  operating said power plant, and
  controlling, during operation of said power plant, at least one of a flow rate of said combustion air into said boiler means, and an operating pressure in said combustion chamber of said boiler means in dependence upon the operating load of said boiler means, and wherein the step of controlling at least one of said flow rate of said combustion air and said operating pressure includes controlling an operation of at least two of the following elements:
  a throttle valve controlling air pressure at an inlet of said compressor means,
  vane means for controlling an air flow rate at said inlet of said compressor means,
  a by-pass valve means for controlling an air flow rate from said compressor means to said boiler means,
  drive means of a booster compressor for controlling pressure of air supplied from said compressor means to said boiler means,
  a valve means for controlling a flow through an expansion turbine operated by compressed air from said compressor means,
  a valve means for controlling a flow rate of combustion gas from said boiler means to said gas turbine, and
  a valve means for controlling combustion gas flow from said boiler means to a second gas turbine not mounted on said spindle.

19. A power plant comprising a pressurized fluidized bed combustion boiler means for burning coal and producing steam by combustion heat and including a combustion chamber in which said coal is burned;
  a gas turbine unit including a gas turbine driven by combustion gas from burning of said coal in said boiler means, a spindle rotated at a constant speed by said turbine, an electrical generator driven at a constant speed by said spindle, a compressor means on said spindle for supplying compressed combustion air to said boiler means for burning the coal;
  control means for controlling, in dependence upon an operating load of said boiler means, at least one of a flow rate of said combustion air into said boiler means, and an operating pressure in said combustion chamber of said boiler means, and wherein said control means includes
  a throttle valve controlling air pressure at an inlet of said compressor means,
  vane means for controlling an air flow rate at said inlet of said compressor means,
  a by-pass valve means for controlling an air flow rate from said compressor means to said boiler means,
  drive means of a booster compressor for controlling pressure of air supplied from said compressor means to said boiler means,
  a first valve means for controlling a flow through an expansion turbine operated by compressed air from said compressor means,
  a second valve means for controlling a flow rate of combustion gas from said boiler means to said gas turbine, and
  a third valve means for controlling combustion gas flow from said boiler means to a second gas turbine not mounted on said spindle and wherein said control means control at least one of said flow rate of said combustion air and said operating pressure by controlling at least two of said throttle valve, said vane means, said by-pass valve means, said drive means, said first valve means, said second valve means and said third valve means.

* * * * *